United States Patent [19]

Tateoka et al.

[11] 4,179,183
[45] Dec. 18, 1979

[54] DEVICE FOR SCANNING A LIGHT BEAM AT A CONSTANT SPEED

[75] Inventors: Masamichi Tateoka, Kawasaki; Kazuo Minoura, Yokohama, both of Japan

[73] Assignee: Canon Kabushiki Kaisha, Tokyo, Japan

[21] Appl. No.: 902,401

[22] Filed: May 3, 1978

[30] Foreign Application Priority Data

May 7, 1977 [JP] Japan .................... 52-52532

[51] Int. Cl.$^2$ .................... G02B 27/17; G02B 9/10
[52] U.S. Cl. .................... 350/6.1; 350/230
[58] Field of Search .................... 350/6.1–6.91, 350/285, 293, 232, 230

[56] References Cited

U.S. PATENT DOCUMENTS

| | | | |
|---|---|---|---|
| 3,668,984 | 6/1972 | Rosin | 350/6.5 |
| 3,961,838 | 6/1976 | Zanoni | 350/232 |
| 3,973,833 | 10/1976 | Lawson | 350/232 |
| 4,108,532 | 8/1978 | Minoura | 350/232 |

*Primary Examiner*—Jon W. Henry
*Attorney, Agent, or Firm*—Fitzpatrick, Cella, Harper & Scinto

[57] ABSTRACT

A light beam scanning device provided with a light source section to emit a scanning beam, a deflector to deflect the light beam from the light source section at a constant angular speed in a predetermined direction, and a lens system to focus the scanning beam deflected by the deflector on a scanning surface, wherein the lens system consists of two single lenses which are mutually positioned at a finite distance, the single lens at the side of the deflector has a negative refractive power, the single lens at the side of the scanning surface has a positive refractive power, and the scanning beam moves at a constant speed on the surface to be scanned due to the lens system having the f-$\theta$ characteristics.

3 Claims, 48 Drawing Figures

FIG. 2
PRIOR ART
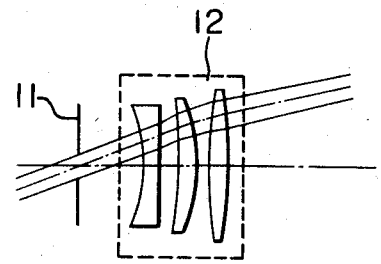
FIG. 3A
PRIOR ART
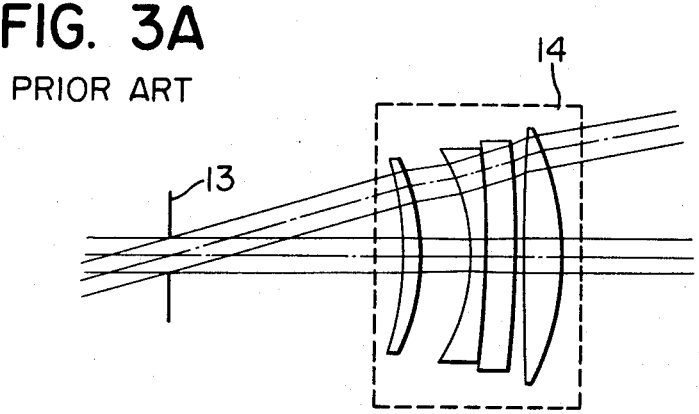
FIG. 3B
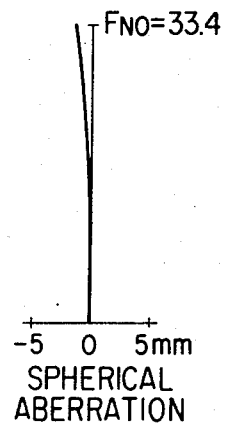
SPHERICAL ABERRATION
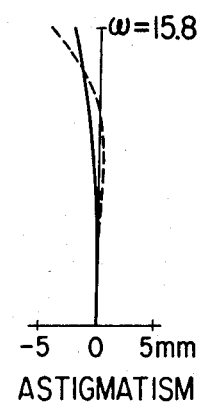
ASTIGMATISM
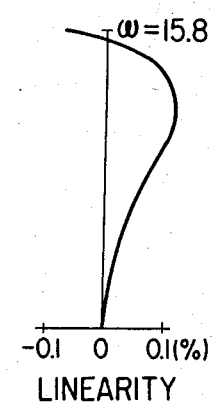
LINEARITY

DEVICE FOR SCANNING A LIGHT BEAM AT A CONSTANT SPEED

BACKGROUND OF THE INVENTION a. Field of the Invention

This invention relates to a light beam scanning device for recording or reading of an image.

FIG. 1 of the accompanying drawing shows a perspective view of one embodiment of the laser beam printer as one example of a device, in which the light beam scanning optical system is utilized. In FIG. 1, a laser beam oscillated from a laser beam oscillator 1 is introduced into an input opening of a modulator 3 through reflecting mirrors 2, 2. The beam which has been subjected to modulation of an information signal to be recorded in the modulator 3 is expanded its beam diameter by a beam expander 4 maintaining its parallel beam, and is projected onto a rotatory polygonal reflecting mirror 5. The rotatory polygonal reflecting mirror 5 is fitted on a shaft which is supported on a highly precise bearing member, and is rotated by a motor 6 rotating at a constant speed. Accordingly, the beam to be deflected by the rotatory polygonal reflecting mirror 5 is deflected at a constant angular speed. The beam deflected by the rotatory polygonal mirror 5 is focussed on a photosensitive drum 8 by a focussing lens 7. Numerals 9 and 10 respectively designate a first corona charger and an a.c. corona discharger, both constituting parts of the electrophotographic processes. In the device of this construction, when the rotatory polygonal mirror 5 is rotated by $\theta/2$, the deflected quantity of the incident angle of the light beam projected into the focussing lens 7 becomes $\theta$. In this case, if an f·tan $\theta$ lens, in which an image height is proportional to a tangent of an angle of deflection, is used as the focussing lens 7 as in the case of photographic lens in general, a moving quantity y of the beam on the photosensitive drum 8 becomes $y = f \cdot \tan \theta$, so that the rotational angle of the rotatory polygonal mirror is not proportional to the moving quantity of the beam on the photosensitive drum. As the consequence, even when the rotatory polygonal mirror deflects the beam at a constant angular speed, the beam on the photosensitive drum (the surface to be scanned) does not move at a constant speed. In this case, when a lens, in which the image height of the beam on the photosensitive drum is proportional to the angle of deflection of the rotatory polygonal mirror, is used for the image focussing lens 7, the image height can be represented by $y = f \cdot \theta$, whereby the angle of rotation of the rotatory polygonal mirror becomes proportional to the moving speed of the beam on the photosensitive drum. In other words, for the scanning beam to be focussed flat on the scanning surface at a constant speed by the use of a deflector which effect the deflection at a constant angular speed, it becomes necessary to use a lens having a characteristic of $y = f \cdot \theta$ (hereinafter referred to as "f-$\theta$ lens") as the focussing lens.

b. Description of the Prior Art

For the f-$\theta$ lens in the conventional light beam scanning device, there is Japanese laid-open patent application No. 51-9463, the construction of which is shown in FIG. 2.

In FIG. 2, a reference numeral 11 designates a deflector such as rotatory polygonal mirror, 12 refers to a group of scanning lenses arranged in the power order of "concave", "convex", and "convex" viewed from the side of the deflector 11. Incident parallel light beam is deflected by the deflector 11, and then projected into the lens system 12. The lens system 12 is flat on the scanning surface, and has such a characteristic that it indicates $y = f \cdot \theta$ of an image height proportional to the angle of deflection. In this lens system, the intended object is attained with the three-lens structure.

For the f-$\theta$ lens used in another light beam scanning device, there is U.S. Pat. No. 3,668,984, the detailed structure of which is shown in FIG. 3A, and its aberration diagram in FIG. 3B. In FIG. 3A, a reference numeral 13 designates a deflector such as galvano-mirror, and 14 refers to a scanning lens system consisting of four single lenses, in which the middle two are mutually put together, and the three-lens group is arranged in the order of "convex", "concave", and "convex" viewed from the side of the deflector. Incident parallel light beam is deflected by the galvano-mirror 13, and then projected into the lens system 14. The lens system 14 is flat on the scanning surface, and has the characteristic of $y = f \cdot \theta$ of an image height proportional to the angle of deflection. With this lens system, however, it is difficult to carry out the wide-angle scanning. That is, as is seen from FIG. 3B, when $\omega/2 \doteq 15.8°$, the characteristic of the angle of view becomes remarkably deteriorated.

As shown in FIG. 4, when a non-afocal beam is scanned by the deflector, there arises inconveniences to be mentioned in the following. That is, the optical system shown in FIG. 4 is that taught is U.S. Pat. No. 3,946,150, in which non-parallel beam is scanned by the deflector and projected into the focussing lens. In this drawing, a reference numeral 15 designates a spherical lens, or a cylindrical lens having a power within the plane of the drawing, which focusses on a point 19. 16 refers to a reflecting surface of a deflector such as a rotatory polygonal mirror, etc., 17 denotes a focussing lens system which is flat on the scanning surface 18, and renders the moving speed of the focussed spot constant. In this optical lay-out, the parallel light beam is converged on a position 19 by the lens 15, and the dispersed light from this point is deflected by the deflector 16 to enter into the focussing lens 17, by which it is focussed on the scanning surface 18. Accordingly, the object point of the focussing lens 17 is on the point 19, hence this object point is focussed on the scanning surface, and it is a finite image focussing. From this, since the object point 19 moves on an arc 20 by the rotation of the deflector 16, the focussing lens 15 is required to render the curvature of the object point to be flat on the image forming surface, and to render the image height constant by producing a predetermined distortion. Further, since the curvature of the object surface is determined by the arrangement of the lens 15 and the deflector 16, curvature of the object surface varies from system to system. Thus, finitude in the focussing lens results in such disadvantages that difficult problem would arise on rectification of aberration in the image forming lens due to curvature of the object surface, and the curvature of the object point differs from system to system, hence the curvature correction is not common and general.

SUMMARY OF THE INVENTION

In view of the foregoing, it is an object of the present invention to provide a light beam scanning device which has a wide scanning view angle, and is provided with a scanning f-$\theta$ lens of a simple construction.

It is another object of the present invention to provide a light beam scanning device, in which image-forming capability of the scanning beam is excellent.

In the light beam scanning device according to the present invention, there are provided a deflector, the deflection angle of which is constant even with lapse of time, and an f-θ lens consisting of two single lenses for focussing a parallel beam to be scanned by the deflector. In this f-θ lens, the front single lens to be disposed at the side of the deflector has the negative refractive power, and the rear single lens to be disposed at the side of the scanning surface has the positive refractive power.

Further, in the light beam scanning device according to the present invention, if the incident parallel light beam into the f-θ lens is one other than monochromatic light, e.g., a beam containing a plurality of wavelengths or white light, a combined lens is used either in the front single lens, or the rear single lens, or both partial systems, whereby the f-θ lens with corrected chromatic aberration can be obtained.

BRIEF DESCRIPTION OF DRAWING

FIG. 2 is a schematic diagram showing one embodiment of the conventional f-θ lens;

FIG. 3A is a schematic diagram showing another embodiment of the conventional f-θ lens;

FIG. 3B is an aberration diagram of the lens shown in FIG. 3A;

DESCRIPTION OF PREFERRED EMBODIMENT

Figure 1:
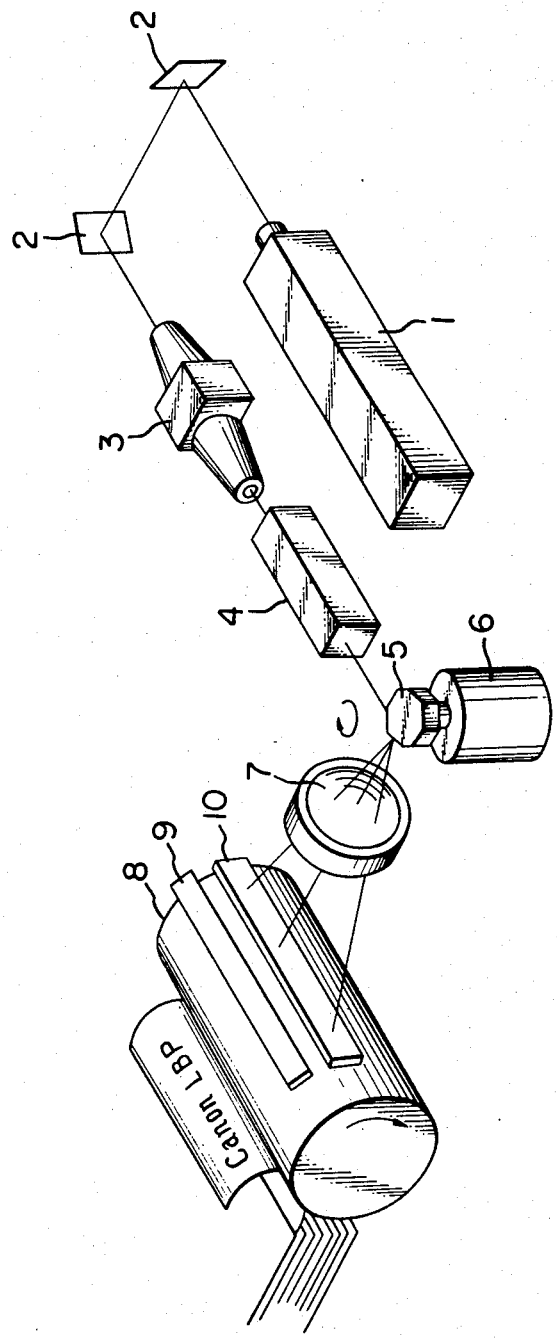
FIG. 1 is a perspective view showing one embodiment of the light beam scanning device.
Figure 4:
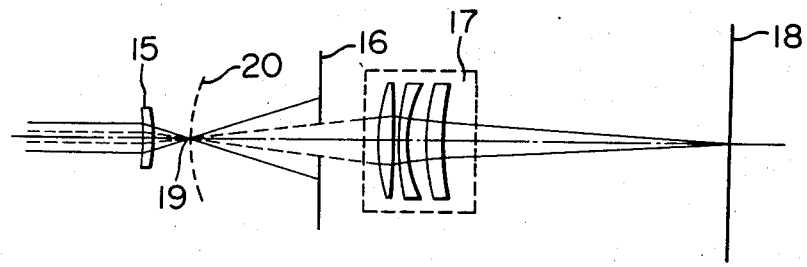
FIG. 4 is a schematic diagram showing one embodiment of the conventional scanning optical system.

The scanning lens for use in the light beam scanning device, particularly, the printer is characterized in that it has a wide angle of view and its ideal image-forming position has a relationship of y=f·θ (where: y denotes a distance between a position of the optical axis of the scanning lens on the scanning surface and an image-forming position of the beam spot; f denotes a focal length of the scanning lens; and θ is an angle to be formed by the incident light beam into the scanning lens and the optical axis of the scanning lens). In general, an image height y', with which the light beam is focussed by the lens is represented by a function of the incident angle θ of the light beam projected into the lens. This image height y' can be represented by the following equation, when a constant is denoted by Ai and the focal length of the lens is denoted by 1. (It should be noted that the following logical equations on the aberration are all based on a reference book "Lens Design" authored by Y. Matsui (published by Kyoritsu Publishing Co., 1972).)

$$y' = \sum_{i=0}^{\infty} A_i \phi^i \quad (1)$$

Further, a relationship between a distortion and a distortion coefficient V of the third degree can be represented by the following equation.

$$\text{Distortion (\%)} = \frac{y' - \tan\theta}{\tan\theta} \times 100 = -50 V \tan^2\theta \quad (2)$$

The above equation (1) is substituted in the equation (2) to rearrange the whole equation, neglecting the terms higher than the fourth degree. The following equation is derived.

$$A_0 + (A_1 - 1)\theta + A_2\theta^2 + (A_3 - \frac{1}{3} + \frac{V}{2})\theta^3 = 0 \quad (3)$$

Here, in order that the above equation (3) may be established without depending on the value of θ, the following relationship should exists.

$$\left.\begin{array}{l} A_0 = A_2 = 0 \\ A_1 - 1 = 0 \\ A_3 - \frac{1}{3} + \frac{V}{2} = 0 \end{array}\right\} \quad (4)$$

That is to say, the image height y' which can be realized in the region of the third degree aberration can be represented in the following equation with the focal length as f.

$$y' = f(\theta + A_3\theta^3) \quad (5)$$

At this time, the third degree distortion coefficient is represented as follows.

$$V = 2(\frac{1}{3} - A_3) \quad (6)$$

Accordingly, in the y'=f·θ lens, $A_3=0$ from the equation (5), hence the third degree distortion coefficient can be represented as V=⅔.

The aberration coefficients to be corrected in a lens in general in the region of the third order aberration coefficient include (I) spherical aberration, (II) coma, (III) astigmatism, (P) Petzval sum, and (V) distortion. Now, permissible ranges of (I) and (II) will be calculated on the basis of f=300 mm, $F_{NO}=60$, and ω/2=20° so that the spot size on the image forming plane may be taken as the approximate diffraction limit. With light of λ=0.6328μ, the spot size is approximately 0.1 mm when $F_{NO}=60$, and the following equations are established, when halo and coma are considered in the region of the third degree aberration coefficient with the halo and coma on the image forming plane being 0.05 mm or below.

$$\text{Halo} = 0.05 \geq \left| \frac{R^3 \cdot I}{2\alpha'_K} \right| \quad (7)$$

$$\text{Coma} = 0.05 \geq \left| \frac{3\tan \omega/2 \cdot R^2 \cdot II}{2\alpha'_K} \right| \quad (8)$$

(where: $\alpha'_K$ is a reduced angle at the side of the image space of the paraxial ray, and can be represented as $1/f$; and R denotes a radius of the entrance pupil when the focal length of the entire system is regularized as 1.) From the above, I and II are respectively $|I| \leq 57.6$ and $|II| \leq 4.4$.

Therefore, the spherical aberration I and the coma aberration II need not be taken into consideration very much as the objects of correction, but the astigmatism III, Petzval sum P and the distortion V alone should be taken into consideration as the object for the correction, because of wide view angle. Of these three aberration coefficients, since the Petzval sum P is determined by the power arrangement and the refractive index of the lens system, it can be considered only when the power arrangement of the lens system is determined. Accordingly, it will be seen that the aberrations necessary to be corrected in this kind of scanning lens in the region of the third degree aberration are the astigmatism III and the distortion V.

According to the theory of aberration, it is seen that the freedom of change in the aberration that can be varied by changing the shape of the lens surface of the thin single lens is 1. From this, the aberrations to be corrected in this kind of scanning lens are III and V. In correcting these aberrations, if it is assumed that the lens system consists of two partial systems and each partial system comprises a single lens, the freedom to the aberrations becomes 2, hence there exists a solution to coincide the aberrations of this kind of lens system with the values of the intended aberration coefficients.

The abovementioned matter will now be explained using equations. Now assume that the intended values are III=0 and V=⅜, the optical system consists of two partial systems, and each partial system comprises a thin single lens. Based on this assumption, the shape of the thin single lens in each of the partial systems is found from the power arrangement of the two partial systems. The proper coefficients $A_0$ and $B_0$ and $P_0$ are represented as follows.

$$A_0 = \left(\frac{N}{N-1}\right)^2 - \frac{2N+1}{N-1}\left(\frac{1}{R}\right) + \frac{N+2}{N}\left(\frac{1}{R}\right)^2 \quad (9)$$

$$B_0 = -\frac{N}{N-1} + \frac{N+1}{N}\left(\frac{1}{R}\right) \quad (10)$$

$$P_0 = \frac{1}{N} \quad (11)$$

(where: R denotes a radius of curvature at the front surface of the thin single lens.)

Using these proper coefficients, the third order aberration coefficients of III and V in the optical system can be represented as follows.

$$III = aIII_1 A_{01} + bIII_1 B_{01} + cIII_1 + aIII_2 A_{02} + bIII_2 B_{02} + cIII_2 \quad (12)$$

$$V = aV_1 A_{01} + bV_1 B_{01} + cV_1 + aV_2 A_{02} + bV_2 B_{02} + cV_2 \quad (13)$$

In the above equations, the suffixes indicate the number of each partial system of the optical system, wherein the suffix 1 denotes the first partial system and the suffix 2 denotes the second partial system.

From the equations (9) and (10), $A_0$ is represented by $B_0$, as follows.

$$A_{0i} = \frac{m_{3i}}{n_{2i}^2} B_{0i}^2 + \left(\frac{m_{2i}}{n_{2i}} - 2m_{3i}\frac{n_{1i}}{n_{2i}^2}\right) B_{0i} + \quad (14)$$

$$(m_{1i} - m_{2i}\frac{n_{1i}}{n_{2i}} + m_{3i}\frac{n_{1i}^2}{n_{2i}^2}) \quad (15)$$

$$\begin{pmatrix} m_{1i} = \left(\frac{Ni}{Ni-1}\right)^2, m_{2i} = -\frac{2Ni+1}{Ni-1}, m_{3i} = \frac{Ni+2}{Ni} \\ n_{1i} = -\frac{Ni}{Ni-1}, n_{2i} = \frac{Ni+1}{Ni} \end{pmatrix}$$

When the equation (14) is substituted in the equations (12) and (13), the following can be derived.

$$III = \quad (16)$$
$$aIII_1\frac{m_{31}}{1n_{21}} B_{01}^2 + \left(aIII_1\left(\frac{m_{21}}{n_{21}} - 2m_{31}\frac{n_{11}}{n_{21}^2}\right) + bIII_1\right) B_{01}$$
$$+ aIII_2\frac{m_{32}}{n_{22}^2} B_{02}^2 + \left(aIII_2\left(\frac{m_{22}}{n_{22}} - 2m_{32}\frac{n_{12}}{n_{22}^2}\right) + bIII_2\right) B_{02}$$
$$+ aIII_1(m_{11} - m_{21}\frac{n_{11}}{n_{21}} + m_{31}\frac{n_{11}^2}{n_{21}^2}) + aIII_2(m_{12} - m_{22}\frac{n_{12}}{n_{22}}$$
$$+ m_{32}\frac{n_{12}^2}{n_{22}^2}) + cIII_1 + cIII_2$$

$$V = \quad (17)$$
$$aV_1\frac{m_{31}}{n_{21}^2} B_{01} + \left(aV_1\left(\frac{m_{21}}{n_{21}} - 2m_{31}\frac{n_{11}}{n_{21}^2}\right) + bV_1\right) B_{01}$$
$$+ aV_2\frac{m_{32}}{n_{22}^2} B_{02}^2 + \left(aV_2\left(\frac{m_{22}}{n_{22}} - 2m_{32}\frac{n_{12}}{n_{22}^2}\right) + bV_2\right) B_{02}$$
$$+ aV_1(m_{11} - m_{21}\frac{n_{11}}{n_{21}} + m_{31}\frac{n_{11}^2}{n_{21}^2}) + aV_2(m_{12} - m_{22}\frac{n_{12}}{n_{22}}$$
$$+ m_{32}\frac{n_{12}^2}{n_{22}^2}) + cV_1 + cV_2$$

From the above equations (16) and (17) $B_{02}^2$ is eliminated, and $B_{02}$ is represented by $B_{01}$. The following equations can be derived.

$$B_{02} = \frac{T_2 l_{11}}{T_1} B_{01}^2 + \frac{T_2 l_{21} + T_3}{T_1} B_{01} + \frac{T_2 l_{31} + T_4}{T_1} \quad (18)$$

-continued $$\begin{cases} l_1i = \frac{m_3i}{n_2{}^2i}, l_2i = \frac{m_2i}{n_2i} - 2m_3i\frac{m_1i}{n_2{}^2i}, l_3i = m_1i - m_2i\frac{n_1i}{n_2i} + m_3i\frac{n_1{}^2i}{n_2{}^2i} \\ T_1 = aV_2bIII_2 - aIII_2bV_2, T_2 = aIII_2V_1 - aIII_1aV_2, \\ T_3 = aIII_2bV_1 - aV_2bIII_1 \\ T_4 = aIII_2(cV_1 + cV_2 - V) - aV_2(cIII_1 + cIII_2 - III) \end{cases} \quad (19)$$

When the equation (18) is substituted in the equation (16) and $B_{01}$ is arranged, the following equation (20) is derived.

$$aIII_2l_{12}(\frac{T_2l_{11}}{T_1})^2 B_{01}^4 + 2aIII_2l_{12}(\frac{T_2l_{11}}{T_1})(\frac{T_2l_{21} + T_3}{T_1})B_{01}^3 \quad (20)$$

$$+ [aIII_1l_{11} + aIII_2l_{12}\left\{2(\frac{T_2l_{11}}{T_1})(\frac{T_2l_{31} + T_4}{T_1}) + \right.$$

$$\left.(\frac{T_2l_{21} + T_3}{T_1})^2\right\} + (aIII_2l_{22} + bIII_2)(\frac{T_2l_{11}}{T_1})]B_{01}^2 +$$

$$[(aIII_1l_{21} + bIII_1) + 2aIII_2l_{12}(\frac{T_2l_{21} + T_3}{T_1})(\frac{T_2l_{31} + T_4}{T_1})$$

$$+ (aIII_2l_{22} + bIII_2)(\frac{T_2l_{21} + T_3}{T_1})]B_{01} + aIII_2l_{12}$$

$$(\frac{T_2l_{32} + T_4}{T_1})^2 + (aIII_2l_{22} + bIII_2)(\frac{T_2l_{31} + T_4}{T_1}) +$$

$$aIII_1l_{31} + aIII_2l_{32} + cIII_1 + cIII_2 - III = 0$$

That is to say, by solving the fourth degree equation, the value of $B_{01}$ of the first partial system with third order aberration coefficients III and V of the optical system being III=0 and V=⅔, respectively, can be found. Then, by substituting $B_{01}$ in the equation (18), the value of $B_{02}$ of the second partial system can be found. When the values of $B_{01}$ and $B_{02}$ are found as such, the shapes of the first and second partial systems can be respectively determined. Also, the aberration coefficients I and II of the two partial systems of the optical system are found by the following equations.

$$I = al_1 A_{01} + bl_1 B_{01} + cI_1 + al_2 A_{02} + bl_2 B_{02} + cI_2 \quad (21)$$

$$II = aII_1 A_{01} + bII_1 B_{01} + cII_1 + aII_2 A_{01} + bII_2 B_{02}. + cII_2 \quad (22)$$

Further, by the use of the Petzval sum of the lens system, the following equation can be derived.

$$P = \phi_1 P_{01} + \phi_2 P_{02} \quad (23)$$

(where: $\phi_1$ is the power of the second partial system when the focal length of the entire lens system is made 1; and $\phi_2$ is the power of the second partial system when the focal length of the entire lens is made 1.)

Furthermore, the total power $\Phi$ of the entire lens system can be represented as follows.

$$\Phi = \phi_1 + \phi_2 - e'\phi_1\phi_2 \quad (24)$$

(where: $e'$ is a space interval between the principal points of the first and second partial systems.)

As stated in the foregoing, there are three types of the scanning lens system consisting of two partial systems, i.e., convex-convex type, convex-concave type, and concave-convex type, each as viewed from the side of the deflector. Of these three types, the convex-convex lens type possesses the positive refractive power in both partial systems, hence its Petzval sum P becomes large, and correction of the spherical distortion and the astigmatism is difficult. With the convex-concave lens type, correction of the distortion is difficult, because the value of the distortion coefficient to be aimed at is V=⅔, hence the distortion to be corrected is in a negative quantity. It is therefore necessary that the convex lens is disposed at a position where the principal ray becomes high so as to generate a negative distortion. In the light beam scanning device of the present invention, the incidence pupil of the scanning lens is so constructed that it may be positioned on the deflecting surface of the deflector. As the consequence of this, the position where the principal ray becomes high is at the second partial system rather than the first partial system, hence when the concave lens is disposed in the second partial system, correction of the distortion becomes difficult. From the foregoing observations, the concave-convex lens type as viewed from the side of the deflector is the most suitable as the power arrangement of the scanning lens.

Figure 5:
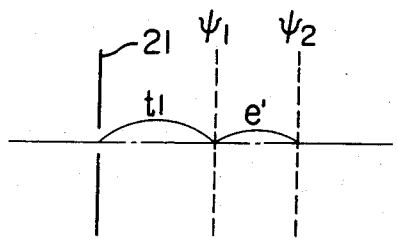
FIG. 5 is a diagram showing power arrangement of the lenses in the light beam scanning device according to the present invention.
Figure 6:
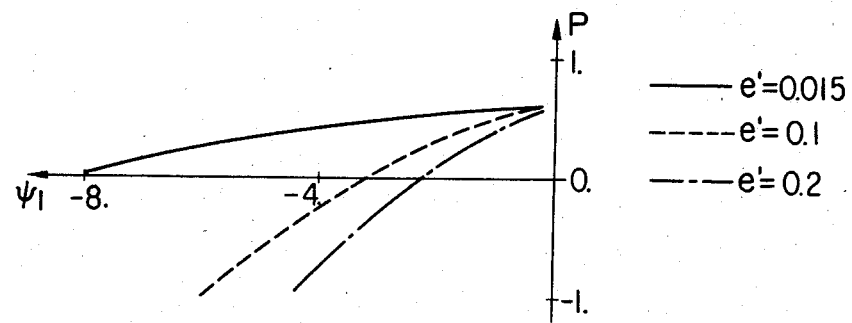
FIG. 6 is a graphical representation showing variations in the Petzval sum, when the power arrangement for the lens construction shown in FIG. 5 is changed.
Figure 7:
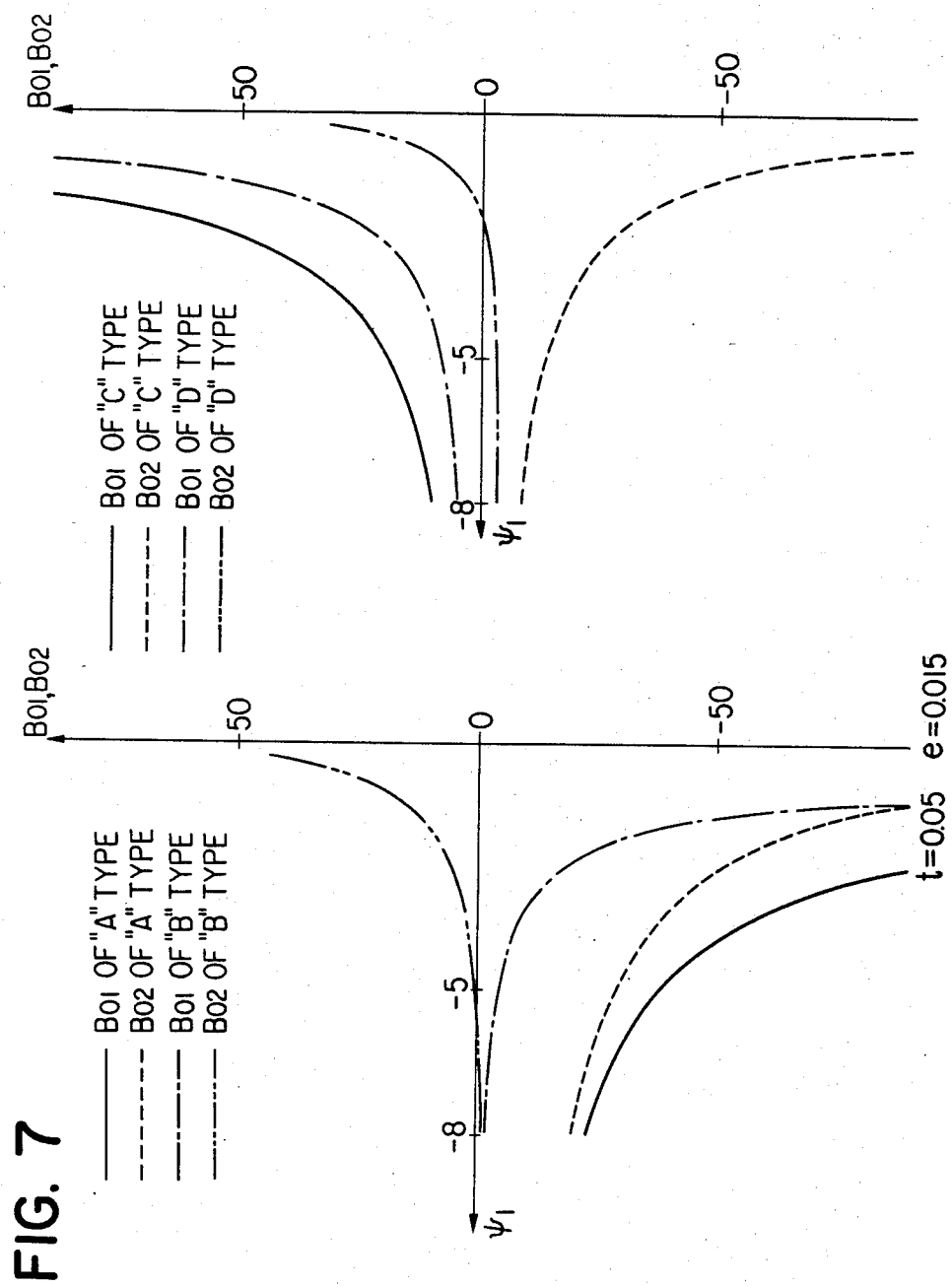
FIGS. 7 through 15 inclusive are respectively graphical representations showing variations in proper values $B_{01}$ and $B_{02}$ when the elements in the lens construction of the light beam scanning device according to the present invention are changed.
Figure 8:
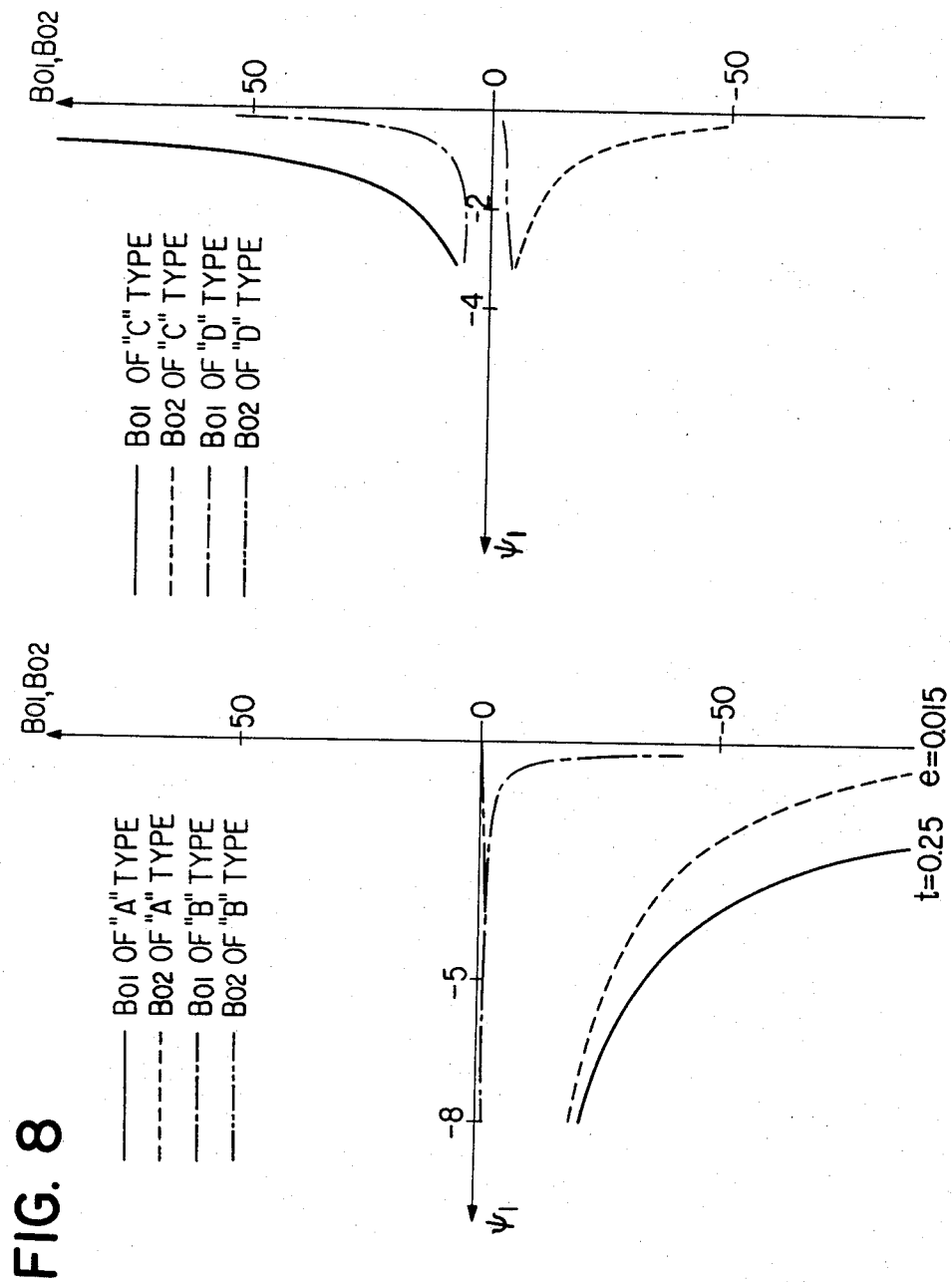
Figure 9:
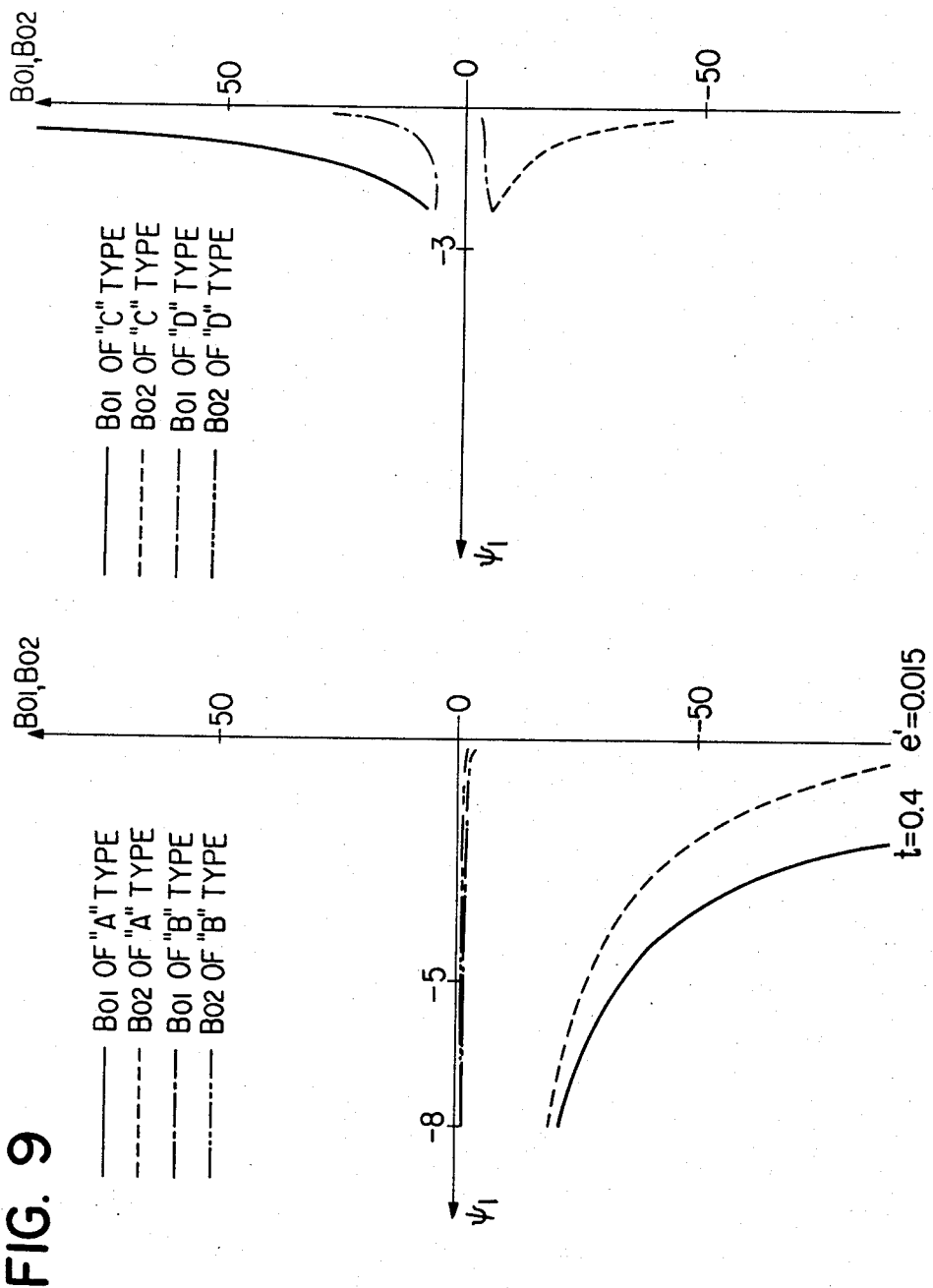
Figure 10:
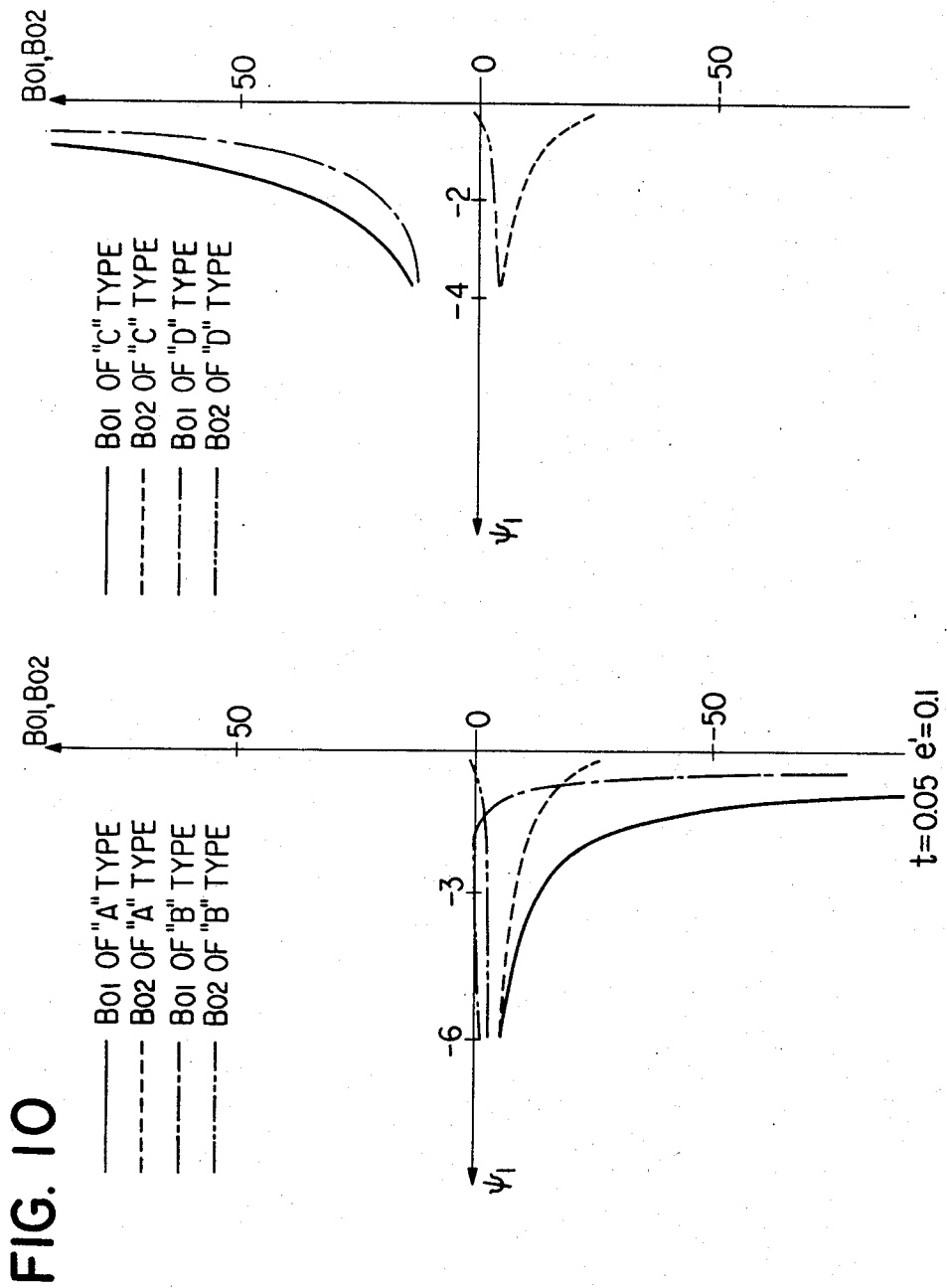
Figure 11:
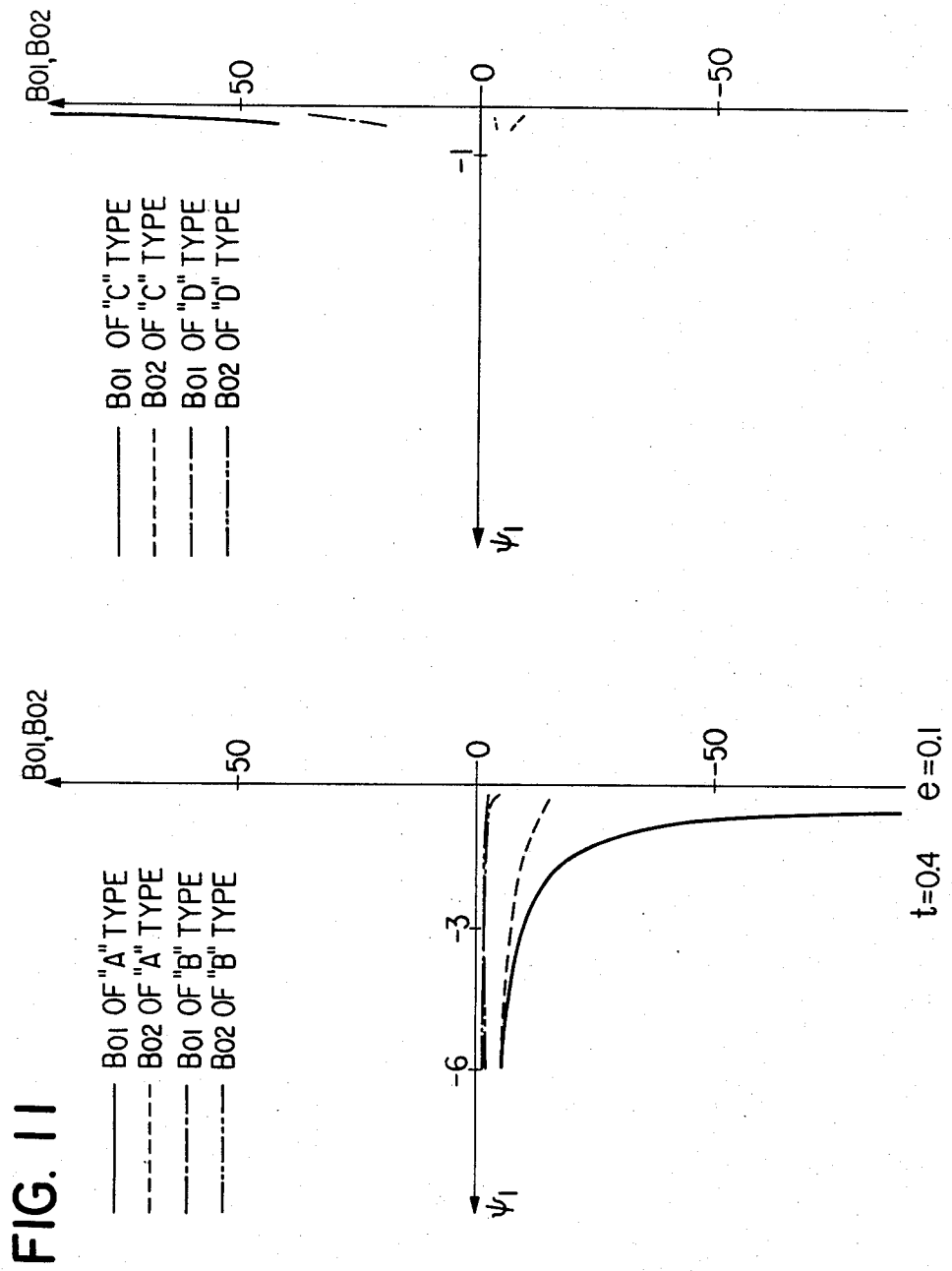
Figure 12:
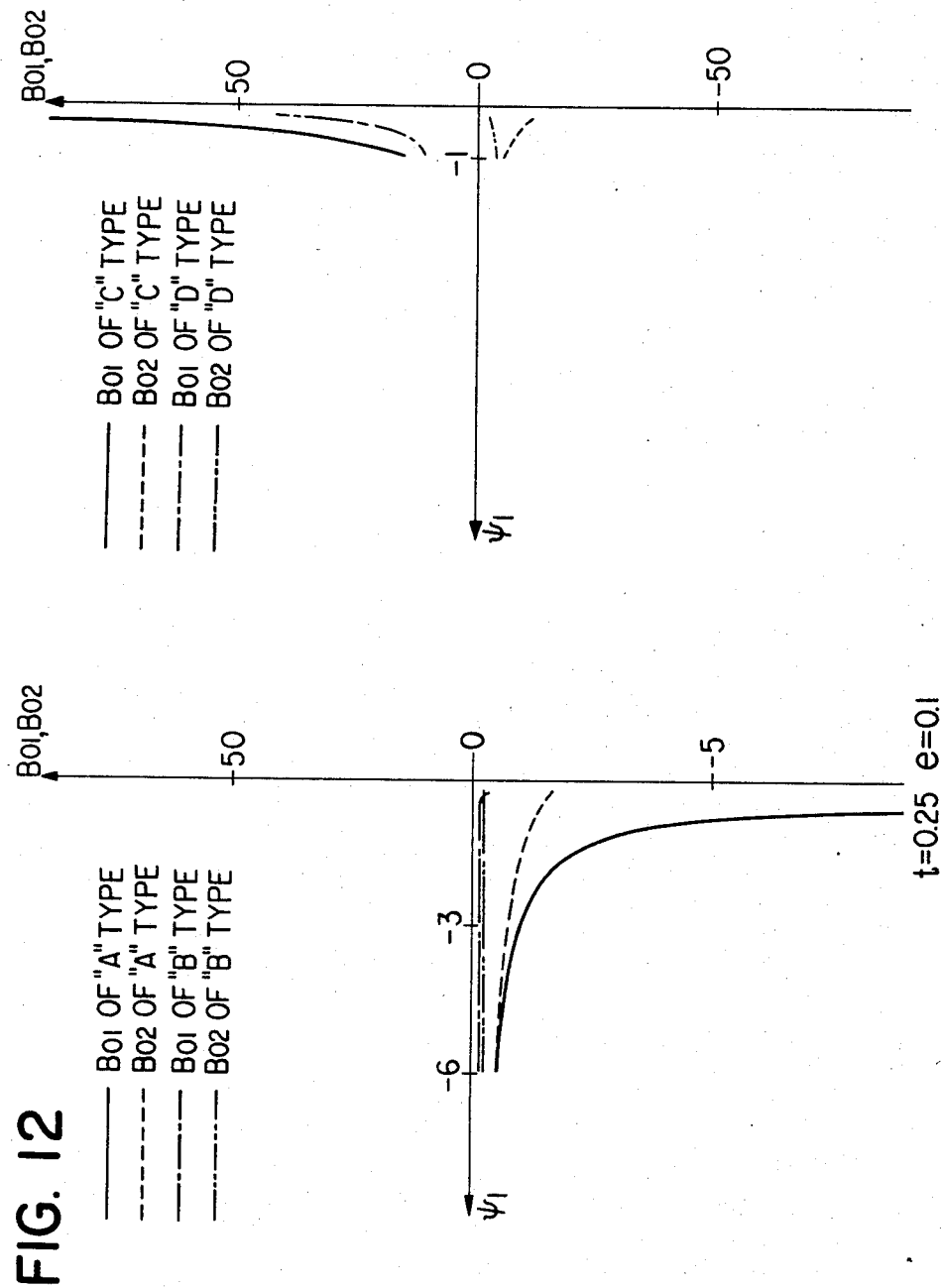
Figure 13:
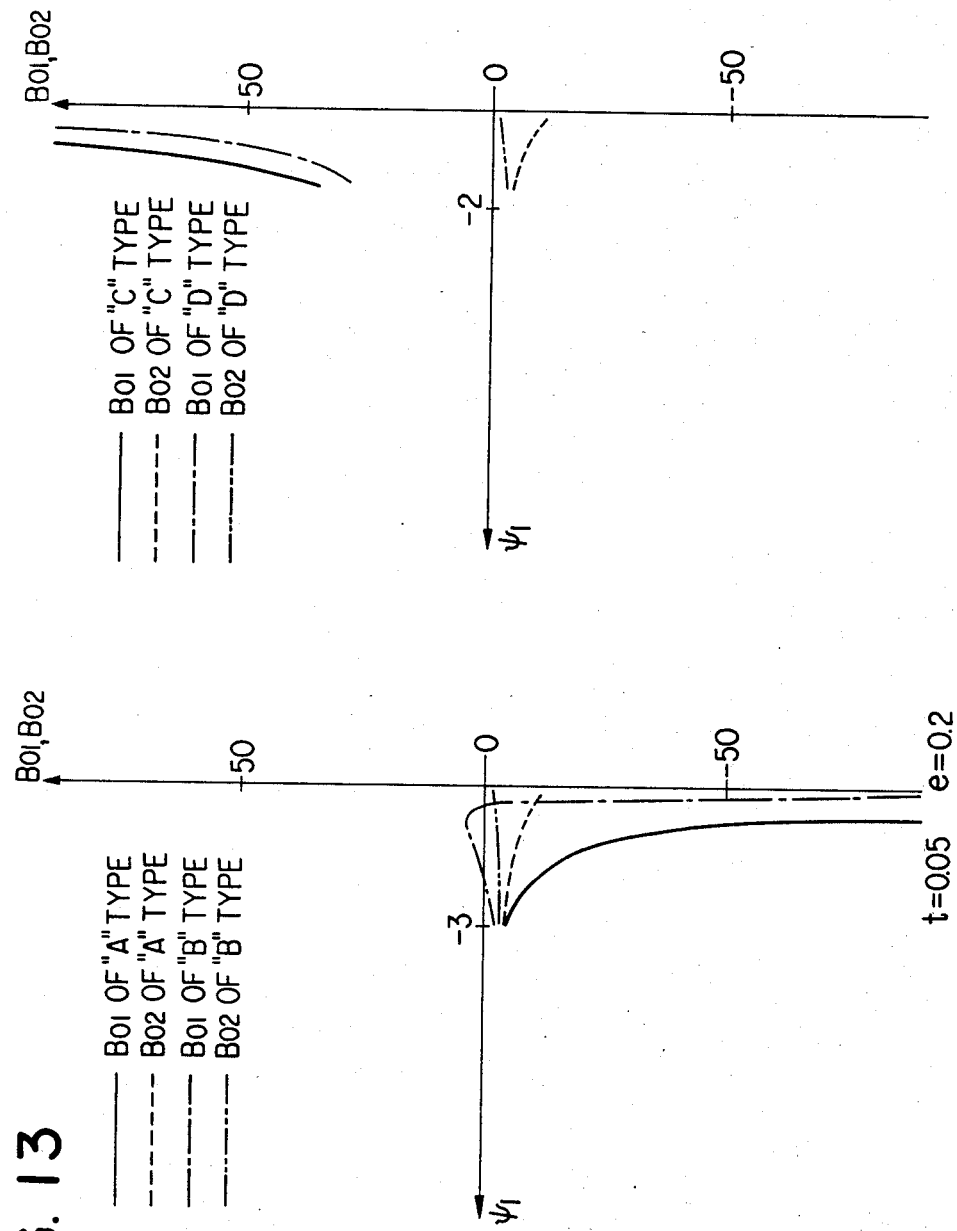
Figure 14:
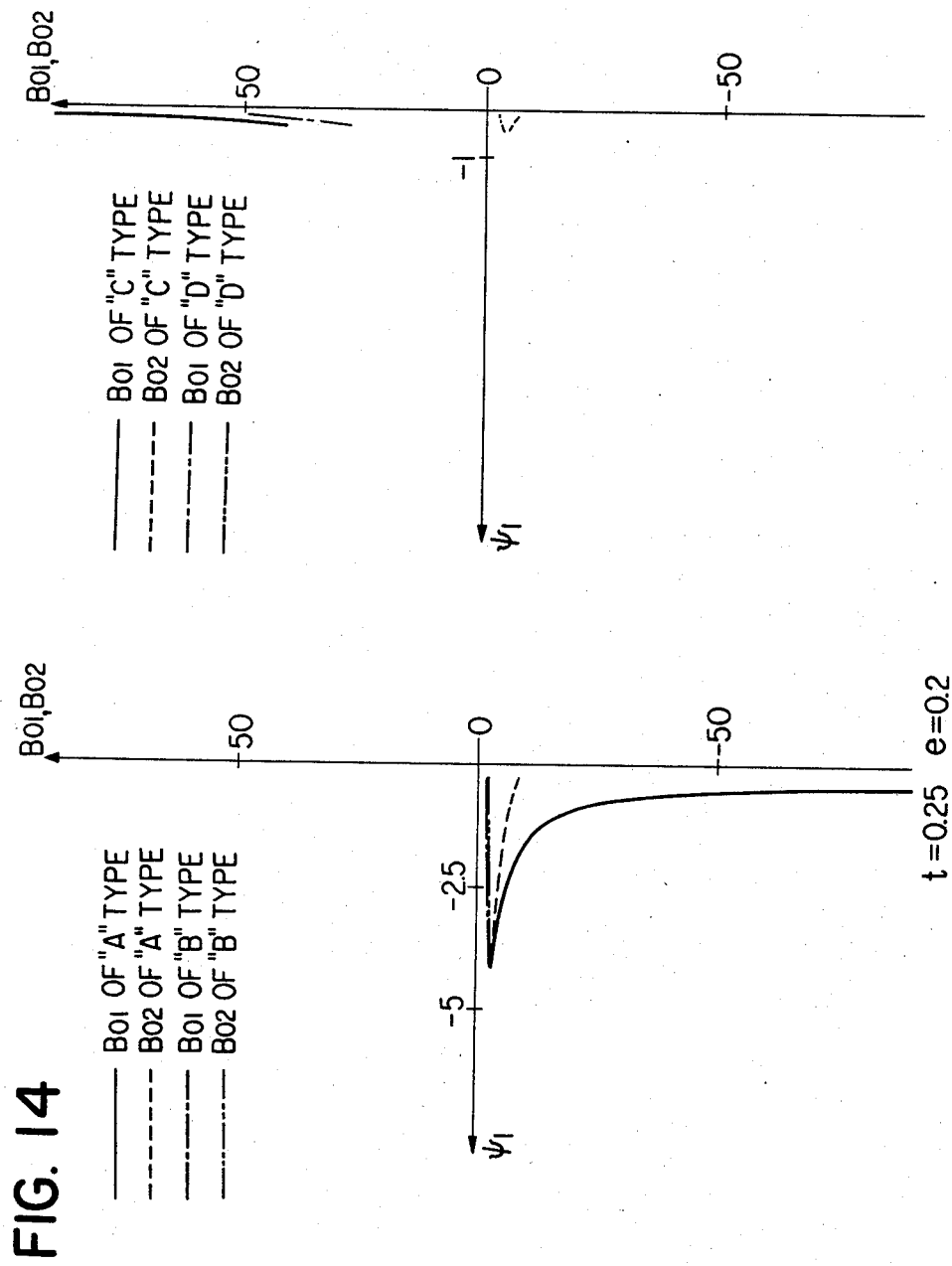
Figure 15:
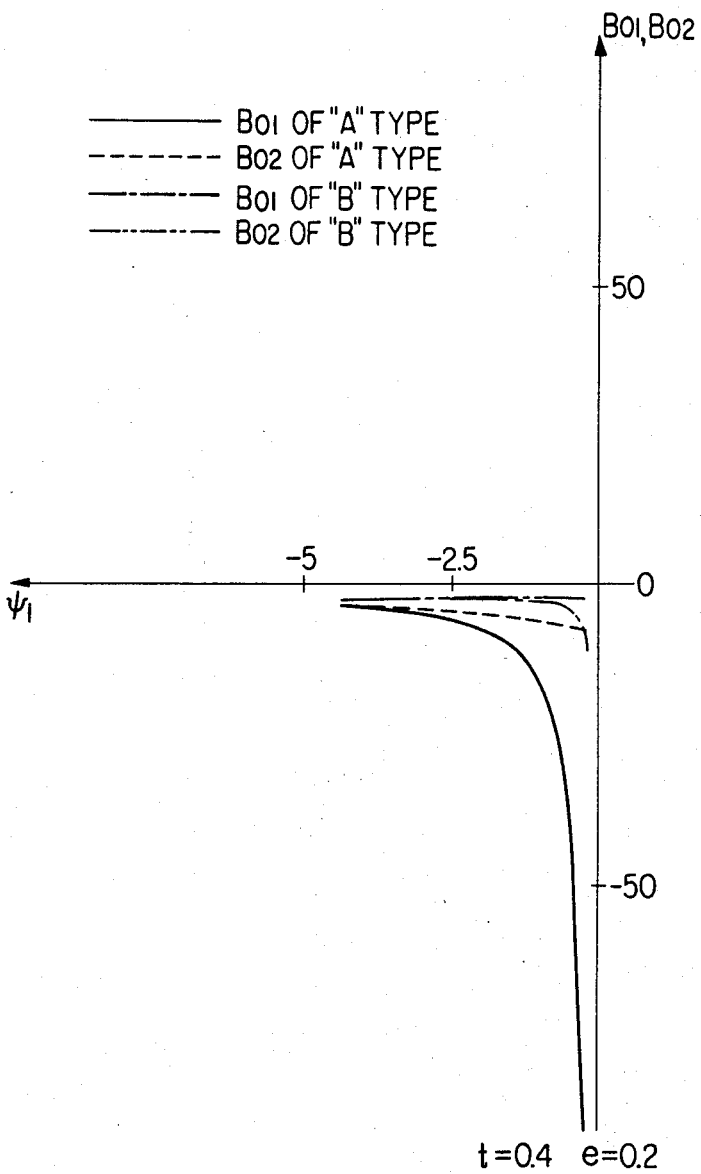

FIG. 5 shows the power arrangement of the lens construction according to the present invention, in which a reference numeral 21 designates a deflecting surface, which constitutes an incidence pupil as viewed from the lens system $t_1$ denotes a distance from the incidence pupil to the principal point of the first partial system, and $e'$ is an interval between the principal point of the first partial system and the principal point of the second partial system. In this arrangement, when $t_1$ and $e'$ are fixed, and $\phi_1$ is varied, the value of $\phi_2$ also varies on the basis of the equation (24). At this time, the value of P varies as shown in FIG. 6 on the basis of the equation (23). Incidentally, $t_1$ has no relationship with P, hence no description is made. $N_1$ and $N_2$ are in the relationship of $N_1 = N_2 = 1.65$.

The graphical representation in FIG. 7 to FIG. 15 show the variations in $B_{01}$ and $B_{02}$ which are obtained by solving the equation (20) of fourth degree for each power arrangement with III=0 and V=⅔ as the aim, and by varying the power arrangement and the space interval $e'$ between the main points in the first and second partial systems with respect to the permissible range of P ($|P| \leq 1$) with the focal length of the entire lens system as 1. The respective figures show the variations in $B_{01}$ and $B_{02}$ when the value of $\phi_1$ is varied ($\phi_2$ can be determined from the equation (24)) with $e'=0.015$ and $t_1=0.05$ in FIG. 7, $e'=0.015$ and $t_1=0.25$ in FIG. 8, $e'=0.015$ and $t_1=0.4$ in FIG. 9, $e'=0.1$ and $t_1=0.05$ in FIG. 10, $e'=0.1$ and $t_1=0.25$ in FIG. 11, $e'=0.1$ and $t_1=0.4$ in FIG. 12, $e'=0.2$ and $t_1=0.05$ in FIG. 13, $e'=0.2$ and $t_1=0.25$ in FIG. 14, and $e'=0.2$ and $t_1=0.4$ in FIG. 15.

Figure 16:
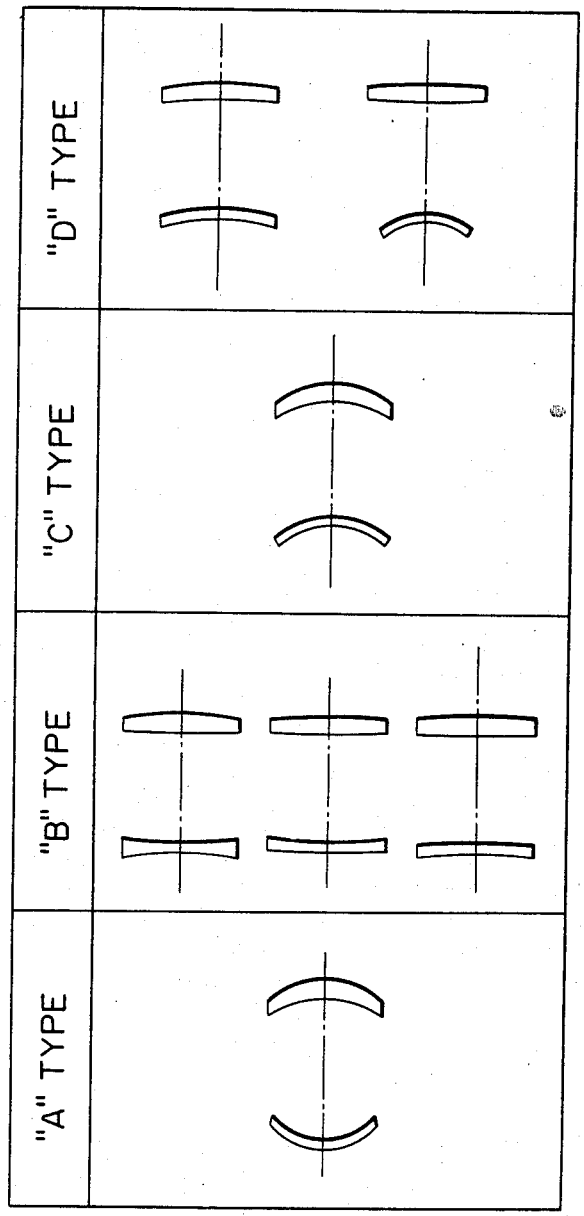
FIG. 16 shows the four types of the lens construction to be used in the light beam scanning device according to the present invention.

It will be seen from FIGS. 7 to 15 that, when the lens system consists of two partial systems, the power arrangement i of concave-convex type, and each partial system consists of a thin single lens, the lens system having a value of the third degree aberration coefficient of III=0 and V=⅔ can be classified into four types of A, B, C and D. The representative shape of each group is shown in FIG. 16.

Of the abovementioned four types of the lens system, the types A and C have larger values of $|B_0|$ than that in the types B and D as shown in FIGS. 7 to 15. In other words, they have a large curvature (1/R) as is apparent from the equation (10), hence correction of the aberration in the higher degree is difficult. On the other hand, the types B and D have a relatively small value of $|B_0|$ and there is no possibility of the higher degree aberration being generated, even when a thick lens is used in the lens system, hence the angle of view can be taken large to suit the practical purpose. Accordingly, this type of scanning lens, i.e., the one characterized in having a wide angle of view, is constituted with the two partial systems in the entire lens system, and the optimum type of the lens system, the power arrangement of which is the concave-convex type, is the types B and D.

In the following, there will be indicated effective ranges, in the abovementioned B-type lens system where the focal length is regularized as 1, of the distance $t_1$ from the incidence pupil to the pricipal point of the first partial system as well as the power $\phi_1$ thereof; the space interval $e'$ between the principal points in the first and second partial systems (the power $\phi_2$ of the second partial system can be determined from the equation (24) upon determination of $\phi_1$ and $e'$, since the focal length of the lens system is regularized as 1); and a proper coefficient of the first partial system (the proper coefficient of the second partial system can be determined from the equation (18) once the proper coefficient of the first partial system is determined).

$$0.05 \leq t_1 \leq 0.4$$

$$-6 \leq \phi_1 \leq -0.4$$

$$0.015 \leq e' \leq 0.2$$

The range of the proper coefficient of the first partial system corresponding to the ranges of these $t_1$, $\phi_1$, and $e'$ with respect to $1.46 \leq N_1 \leq 1.84$, $1.46 \leq N_2 \leq 1.84$ will be as follows.

$$-11.4634 \leq B_{01} \leq 0.8648$$

If the focal length of the entire lens system is f, the following will be derived.

$$\frac{-4.9198 \times \phi_1}{f} \leq 1/r_1 \leq \frac{1.9795 \times \phi_1}{f}$$

(where: $r_1$ is a radius of curvature of the first partial system at the side surface of the deflector.)

In the D-type lens system, the effective ranges are as follows in the system where the focal length is regularized as 1.

$$0.05 \leq t_1 \leq 0.4$$

$$-4. \leq \phi_1 \leq -0.4$$

$$0.025 \leq e' \leq 0.1$$

The range of the proper coefficient of the first partial system corresponding to the ranges of these $t_1$, $\phi_1$, and $e'$ with respect to $1.46 \leq N_1 \leq 1.84$, $1.46 \leq N_2 \leq 1.84$ will be as follows.

$$6.5615 \leq B_{01} \leq 18.1779$$

If the focal length of the entire lens system is f, the following will be derived.

$$\frac{5.7779 \times \phi_1}{f} \leq 1/r_1 \leq \frac{12.6722 \times \phi_1}{f}$$

In the following, explanations will be given as to setting of the ranges of $t_1$, $\phi_1$, and $e'$ in the abovementioned B and D type lens systems. When the upper limit value of the abovementioned range of $t_1$ is exceeded, the outer diameter of the scanning lens becomes large, since the space interval between the scanning lens and the deflector becomes too wide. On the other hand, when the lower limit value of $t_1$ is exceeded, the deflector and the scanning lens collide against each other, since the outer diameter of the scanning lens and the deflector become too narrow.

As regards $\phi_1$, when the upper limit value of the set range for $\phi_1$ is exceeded, the shape of the lens in the first partial system of the scanning lens changes to that of the A type or B type, whereby the high degree aberration generates and the view angle characteristic becomes deteriorated. On the other hand, when the lower limit value of $\phi_1$ is exceeded, the power load in the first partial system of the scanning lens becomes large, whereby a great deal of distortion generates and the view angle characteristic becomes deteriorated.

As regards $e'$, when the upper limit value of the set range for $e'$ is exceeded, the space interval between the first partial system and the second partial system widens, and the entire lens system increases its size. On the other hand, when the lower limit value of $e'$ is exceeded, the first partial system and the second partial system intersect to result in an unrealistic type of the lens system.

In the following, the actual embodiments of the scanning f-$\theta$ lens to be used in the light beam scanning device according to the present invention will be described. Examples 1 through 10 relates to the B-type lens, while Examples 11 to 15 relates to the D-type lens. The shape and the aberration diagram for the lenses in Examples 1 through 15 inclusive are shown in FIGS. 17A, 17B through FIGS. 31A, 31B, respectively. In the aberration diagrams, reference letters SA, AS, M and S respectively denote the spherical aberration, the astigmatism, the meridional surface, and the sagittal surface. LIN refers to linearity which can be represented as linearity $$= \frac{y' - f\theta}{y'} \times 100$$

(where: y' denotes an image height). Further, various reference letters for the lens data are as follows: $r_1$ to $r_4$ denote the radius of curvature of the lens; $n_1$ the refractive index of the first partial system; $n_2$ the refractive index of the second partial system; $d_0$ an axial space interval between the deflecting surface and the surface $r_1$ of the first partial system; $d_1$ an axial lens thickness in the first partial system; $d_2$ an axial air interval between the surface $r_2$ of the first partial system and the surface $r_3$ of the second partial system, and $d_3$ an axial lens thickness in the second partial system.

EXAMPLE 1

Figure 17A:
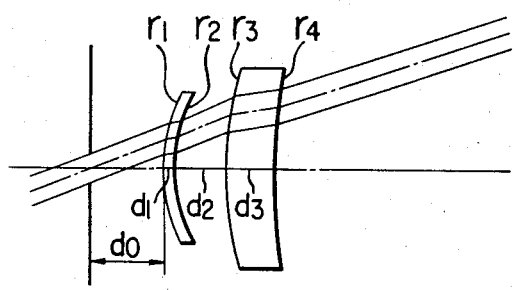
FIGS. 17A through 26A inclusive respectively show B-type lens constructions according to the present invention, and FIGS. 17B through 26B respectively show the aberration diagrams.
Figure 17B:
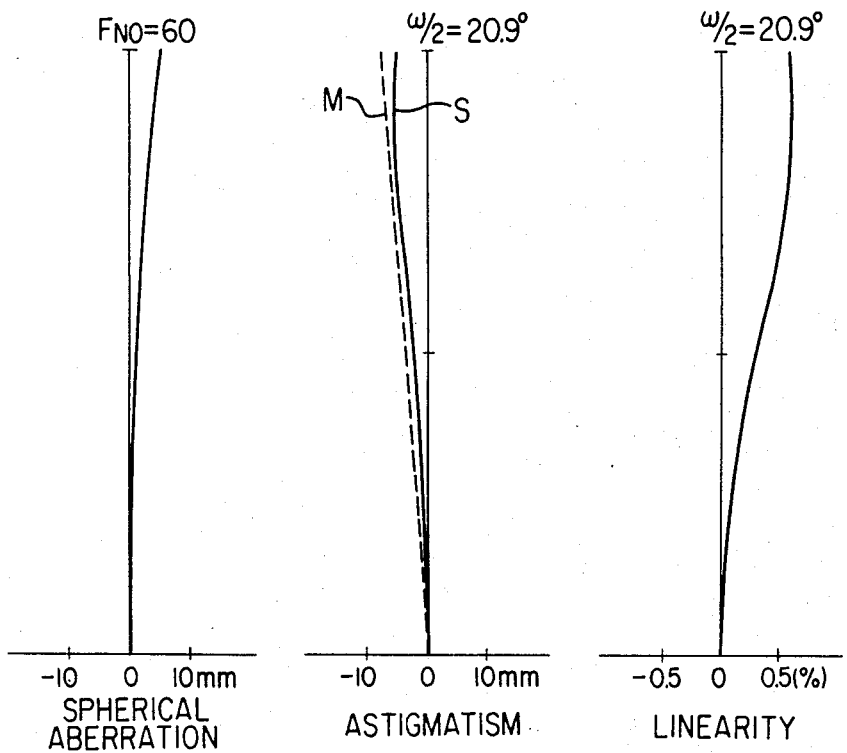

(FIG. 17(A) for construction; FIG. 17(B) for aberration)

$f = 300$, $FNO = 1 : 60$, $\omega/2 = 20.9°$,
wavelength used: $\lambda = 0.6328\mu$
$d_0 = 12.864$
$r_1 = 30.489$   $d_1 = 0.831$   $n_1 = 1.65$
$r_2 = 22.977$   $d_2 = 8.524$
$r_3 = 47.964$   $d_3 = 9.297$   $n_2 = 1.65$
$r_4 = 156.223$ The aberration coefficients when the focal length is regularized as $f=1$.

$I = -513.851$,   $II = -34.8015$,   $III = 0.1722$
$P = 0.4402$,     $V = 0.4622$

The power arrangement and the proper coefficients of each block when the focal length is regularized as $f=1$.

$\Phi_1 = -2$           $t = 0.05$,      $B_{01} = -10.4399$
$\Phi_2 = 2.9126$,      $e' = 0.015$,    $B_{02} = 0.9105$

EXAMPLE 2

Figure 18A:
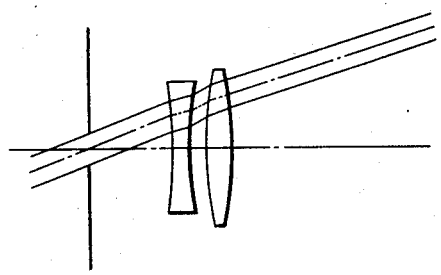
Figure 18B:
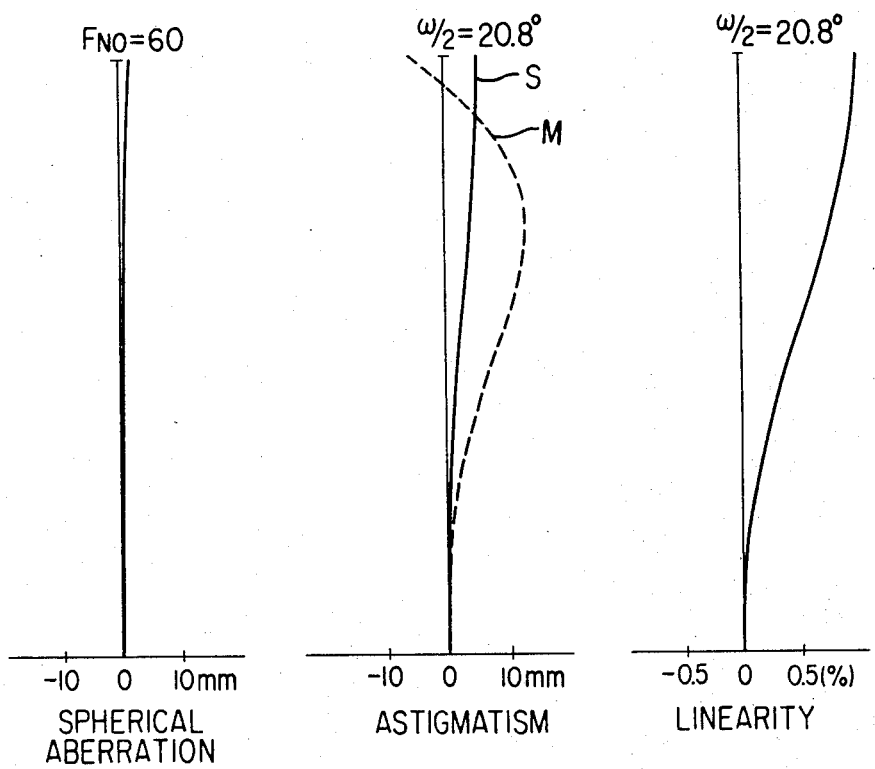

(FIG. 18(A) for construction; FIG. 18(B) for aberration)

$f = 300$, $FNO = 1 : 60$, $\omega/2 = 20.8°$,
wavelength used: $\lambda = 0.6328\mu$,
$d_0 = 13.571$
$r_1 = -204.873$   $d_1 = 2.82$    $n_1 = 1.65$
$r_2 = 39.111$     $d_2 = 3.088$
$r_3 = 53.927$     $d_3 = 4.195$   $n_2 = 1.65$
$r_4 = -68.043$ The aberration coefficients when the focal length is regularized as $f=1$.

$I = -207.3374$,   $II = -26.6899$,   $III = -0.6937$
$P = 0.3294$,      $V = 0.4084$

The power arrangement and the proper coefficients of each block when the focal length is regularized as $f=1$.

$\Phi_1 = -5.956$,   $t = 0.05$,     $B_{01} = -2.1442$
$\Phi_2 = 6.3848$,   $e' = 0.015$,   $B_{02} = -1.1411$

EXAMPLE 3

FIG. (19(A) for construction; FIG. 19(B) for aberration)

$f = 300$, $FNO = 1 : 60$, $\omega/2 = 17.03°$,
wavelength used: $\lambda = 0.6328\mu$,
$d_0 = 72.249$
$r_1 = -447.184$   $d_1 = 5.279$    $n_1 = 1.65$
$r_2 = 70.88$      $d_2 = 0.388$
$r_3 = 72.372$     $d_3 = 16.816$   $n_2 = 1.65$
$r_4 = -134.899$ The aberration coefficients when the focal length is regularized as $f=1$.

$I = 9.4746$,    $II = -1.0533$,   $III = -0.3633$
$P = 0.5774$,    $V = 0.4031$,

The power arrangement and the proper coefficients of each block when the focal length is regularized as $f=1$.

$\Phi_1 = -3.2$,     $t = 0.25$,     $B_{01} = -2.2018$
$\Phi_2 = 4.0076$    $e' = 0.015$,   $B_{02} = -0.8772$

EXAMPLE 4

Figure 20A:
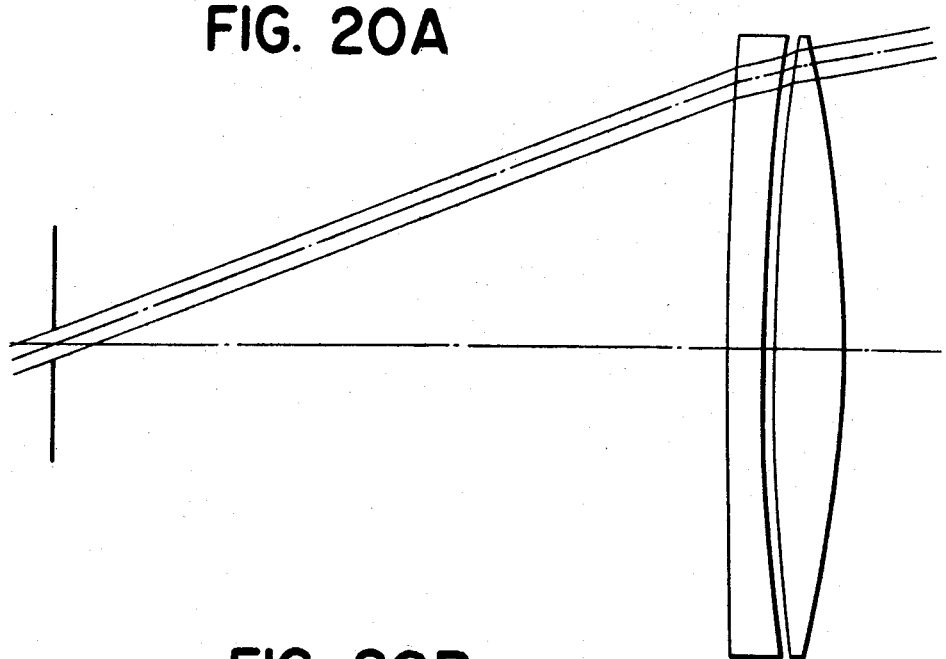
Figure 20B:
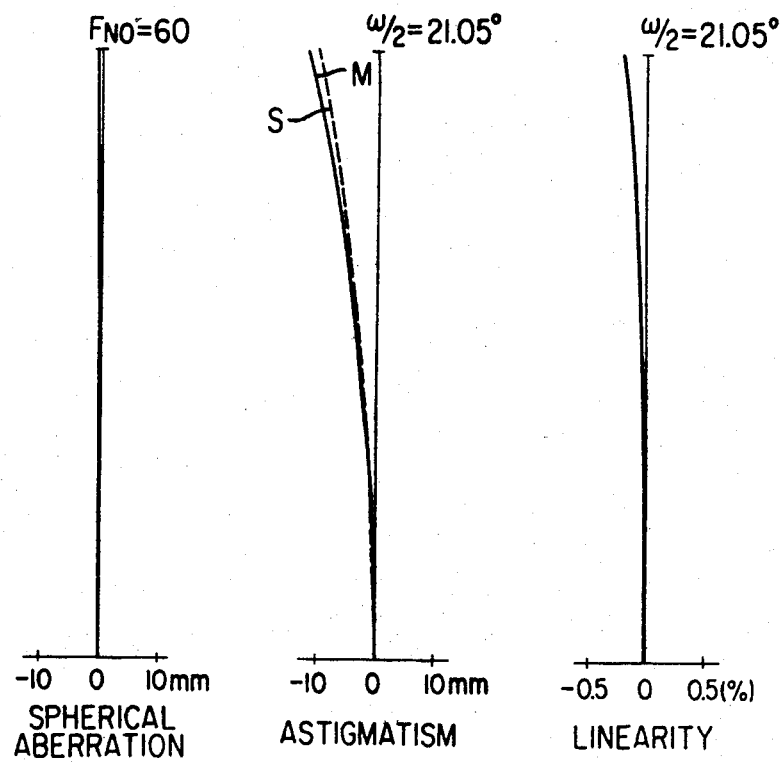

(FIG. 20(A) for construction; FIG. 20(B) for aberration)

$f = 300$, $FNO = 1 : 60$, $\omega/2 = 21.05°$
wavelength used: $\lambda = 0.6328\mu$,
$d_0 = 113.9414$
$r_1 = 1187.6279$   $d_1 = 7.0708$    $n_1 = 1.65$
$r_2 = 344.8159$    $d_2 = 2.0085$
$r_3 = 387.8132$    $d_3 = 10.8597$   $n_2 = 1.65$
$r_4 = -216.9692$ The aberration coefficients when the focal length is regularizedas $f=1$.

$I = 5.3087$,    $II = -0.0922$,   $III = -0.0171$
$P = 0.6062$     $V = 0.6808$,

The power arrangement and the proper coefficients of each block when the focal length is regularized as $f=1$.

$\Phi_1 = -0.4$,    $t = 0.4$,      $B_{01} = -3.5527$
$\Phi_2 = 1.3917$,  $e' = 0.015$,   $B_{02} = 1.6457$

EXAMPLE 5

Figure 21A:
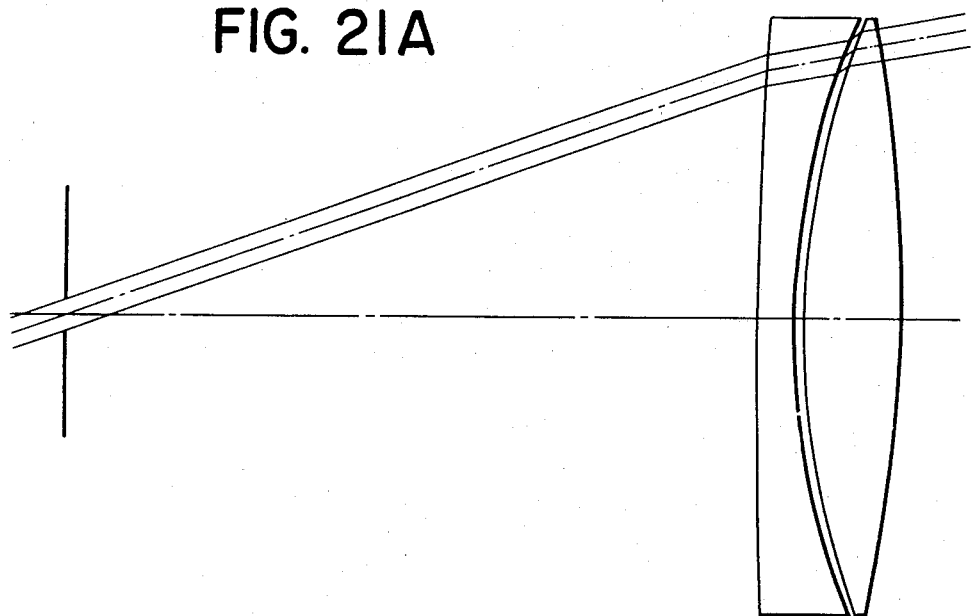
Figure 21B:
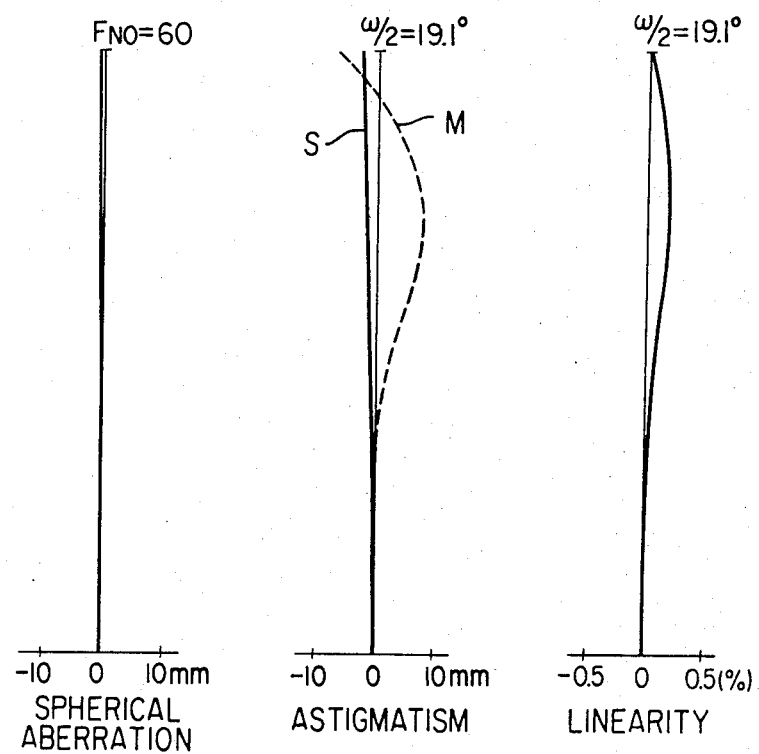

(FIG. 21(A) for construction; FIG. 21(B) for aberration)

$f = 300$, $FNO = 1 : 60$, $\omega/2 = 19.1°$,
wavelength used: $\lambda = 0.6328\mu$
$d_0 = 115.584$
$r_1 = 783.755$    $d_1 = 6.2$      $n_1 = 1.65$
$r_2 = 114.433$    $d_2 = 1.743$
$r_3 = 121.627$    $d_3 = 16.059$   $n_2 = 1.65$
$r_4 = -232.64$ The aberration coefficients when the focal length is regularized as $f=1$.

$I = 3.0057$,    $II = -0.931$,   $III = -0.3176$
$P = 0.5977$,    $V = 0.6243$,

The power arrangement and the proper coefficients of each block when the focal length is regularized as $f=1$.

$\Phi_1 = -1.4498$,   $t = 0.4$,   $B_{01} = -2.9625$

| | | |
|---|---|---|
| $\Phi_2 = 2.3977,$ | $e' = 0.015,$ | $B_{02} = -0.8864$ |

EXAMPLE 6

Figure 22A:
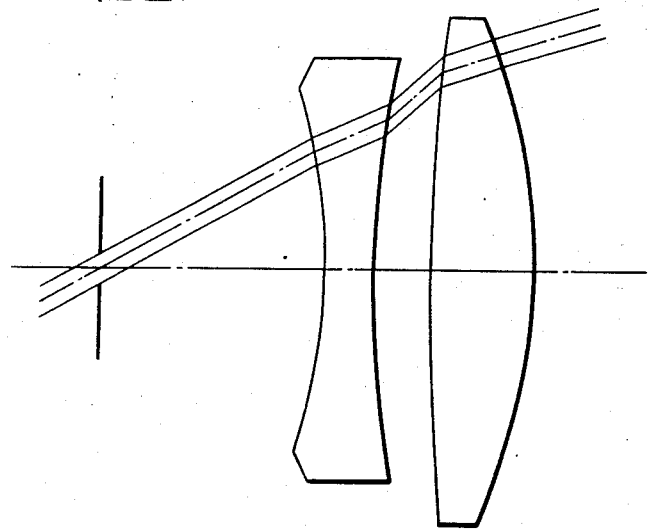
Figure 22B:
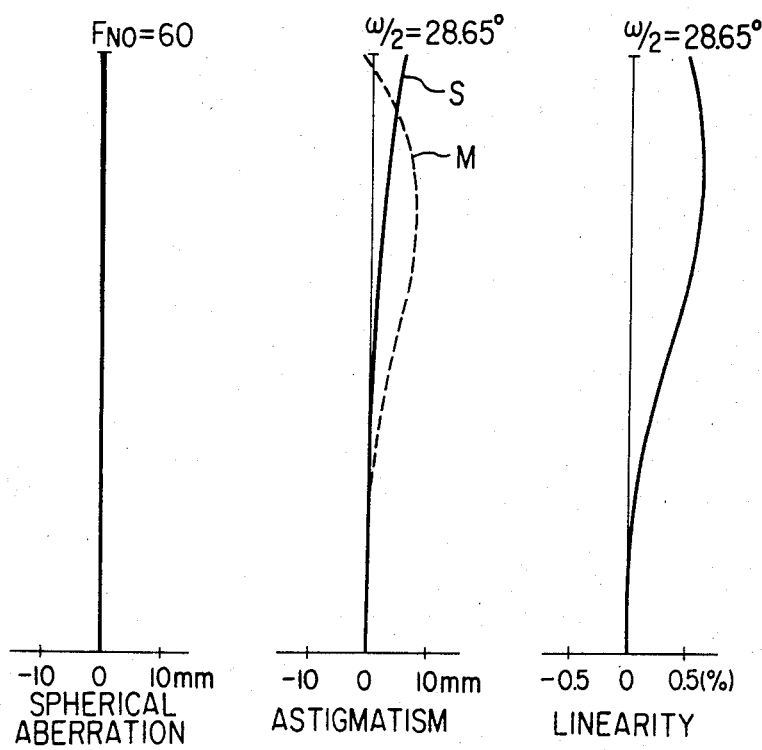

(FIG. 22(A) for construction; FIG. 22(B) for aberration)

| | | |
|---|---|---|
| $f = 300$, FNO = 1 : 60, $\omega/2 = 28.65°$, | | |
| wavelength used: | $\lambda = 0.6328\mu,$ | |
| | $d_0 = 37.9472$ | |
| $r_1 = -104.605$ | $d_1 = 8.3761$ | $n_1 = 1.50839$ |
| $r_2 = 192.2735$ | $d_2 = 9.7979$ | |
| $r_3 = 410.9009$ | $d_3 = 17.3272$ | $n_2 = 1.79883$ |
| $r_4 = -105.0861$ | | |

The aberration coefficients when the focal length is regularized as f=1.

| | | |
|---|---|---|
| $I = 19.97,$ | $II = -0.2535,$ | $III = -0.1543$ |
| $P = 0.0995,$ | $V = 0.5485$ | |

The power arrangement and proper coefficients of each block, when the focal length is regularized as f=1.

| | | |
|---|---|---|
| $\Phi_1 = -2.272,$ | $t = 0.133,$ | $B_{01} = -0.8685$ |
| $\Phi_2 = 2.8202,$ | $e' = 0.0705,$ | $B_{02} = -1.8492$ |

EXAMPLE 7

Figure 23A:
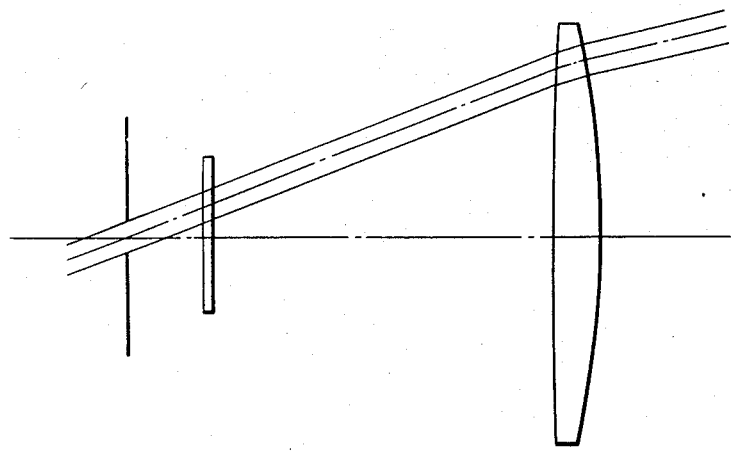
Figure 23B:
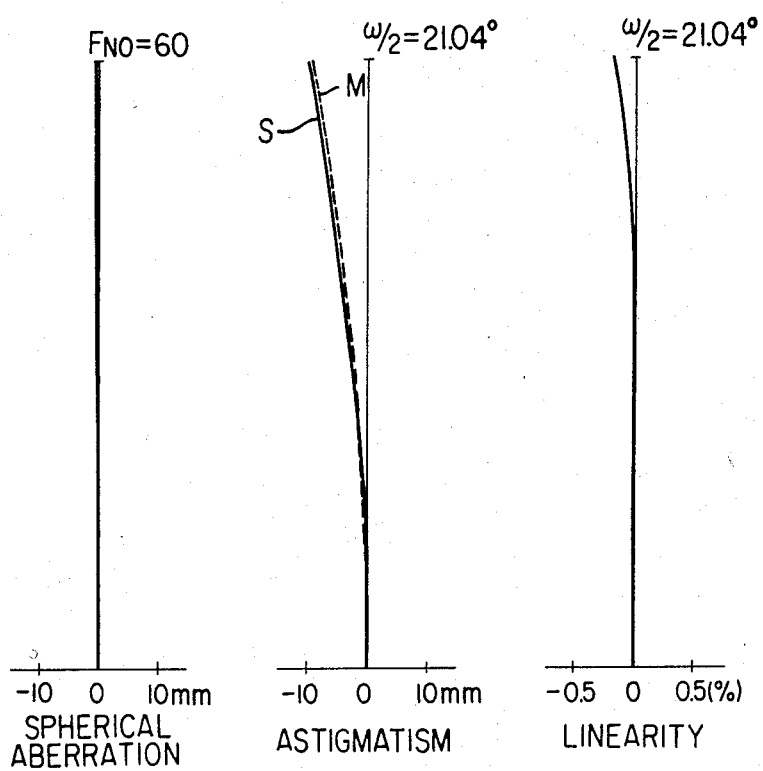

(FIG. 23(A) for construction; FIG. 23(B) for aberration)

| | | |
|---|---|---|
| $f = 300$, FNO = 1 : 60, $\omega/2 = 21.04°$, | | |
| wavelength used: | $\lambda = 0.6328\mu,$ | |
| | $d_0 = 12.9914$ | |
| $r_1 = 678.3716$ | $d_1 = 1.9262$ | $n_1 = 1.65$ |
| $r_2 = 283.3384$ | $d_2 = 56.4336$ | |
| $r_3 = 1218.104$ | $d_3 = 8.2708$ | $n_2 = 1.65$ |
| $r_4 = -171.164$ | | |

The aberration coefficients when the focal length is regularized as f=1.

| | | |
|---|---|---|
| $I = 8.8501,$ | $II = -1.3169,$ | $III = -0.0041$ |
| $P = 0.5446,$ | $V = 0.6592$ | |

The power arrangement and proper coefficients of each block, when the focal length is regularized as f=1.

| | | |
|---|---|---|
| $\Phi_1 = -0.4,$ | $t = 0.05$ | $B_{01} = -4.3141$ |
| $\Phi_2 = 1.2963,$ | $e' = 0.2$ | $B_{02} = -2.2333$ |

EXAMPLE 8

Figure 24A:
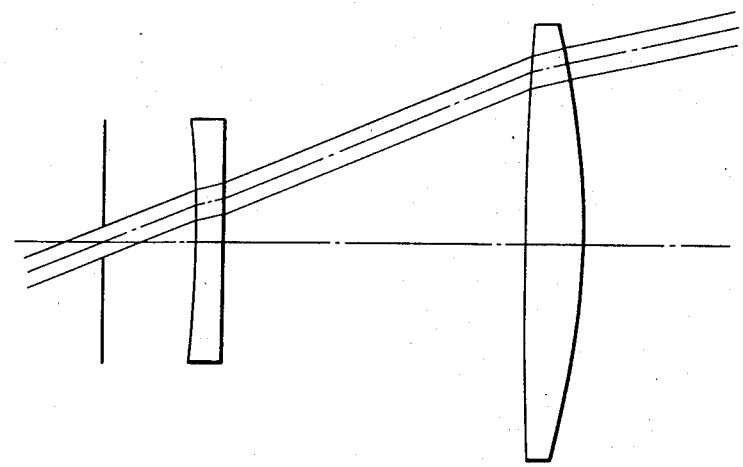
Figure 24B:
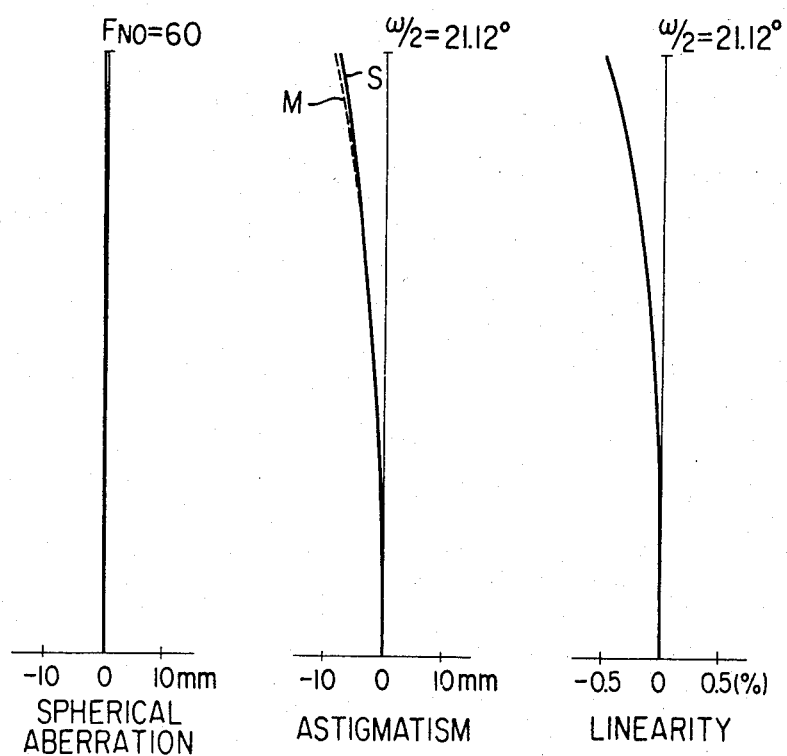

(FIG. 24(A) for construction; FIG. 24(B) for aberration)

| | | |
|---|---|---|
| $f = 300,$ | FNO = 1:60, | $\omega/2 = 21.12°,$ |
| wavelength used: | $\lambda = 0.6328\mu,$ | |
| | $d_0 = 15.7232$ | |
| $r_1 = -189.4439$ | $d_1 = 4.1992$ | $n_1 = 1.65$ |
| $r_2 = -857.7339$ | $d_2 = 51.0926$ | |
| $r_3 = 1803.8304$ | $d_3 = 9.9685$ | $n_2 = 1.65$ |

| |
|---|
| $r_4 = -134.7829$ |

The aberration coefficients when the focal length is regularized as f=1.

| | | |
|---|---|---|
| $I = 18.1113,$ | $II = 0.7024,$ | $III = -0.0174$ |
| $P = 0.4563,$ | $V = 0.7119$ | |

The power arrangement and proper coefficients of each block, when the focal length is regularized as f=1.

| | | |
|---|---|---|
| $\phi_1 = -0.8,$ | $t = 0.05,$ | $B_{01} = 0.6407$ |
| $\phi_2 = 1.5517,$ | $e' = 0.2,$ | $B_{02} = -2.3663$ |

EXAMPLE 9

Figure 25A:
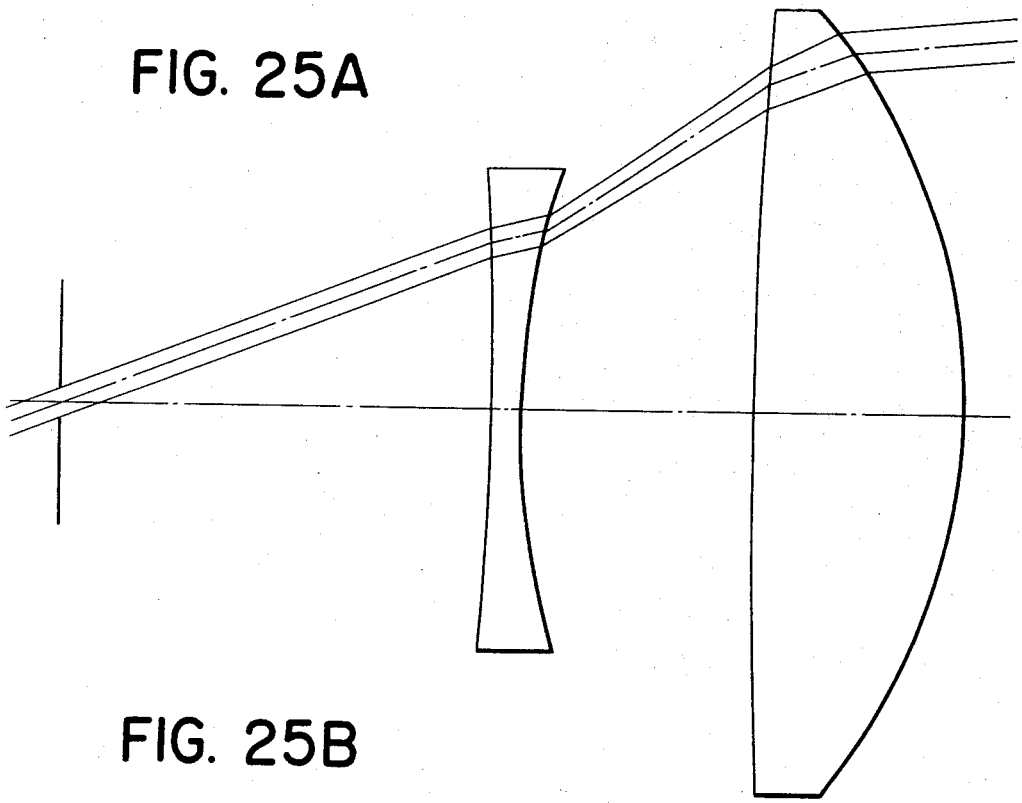
Figure 25B:
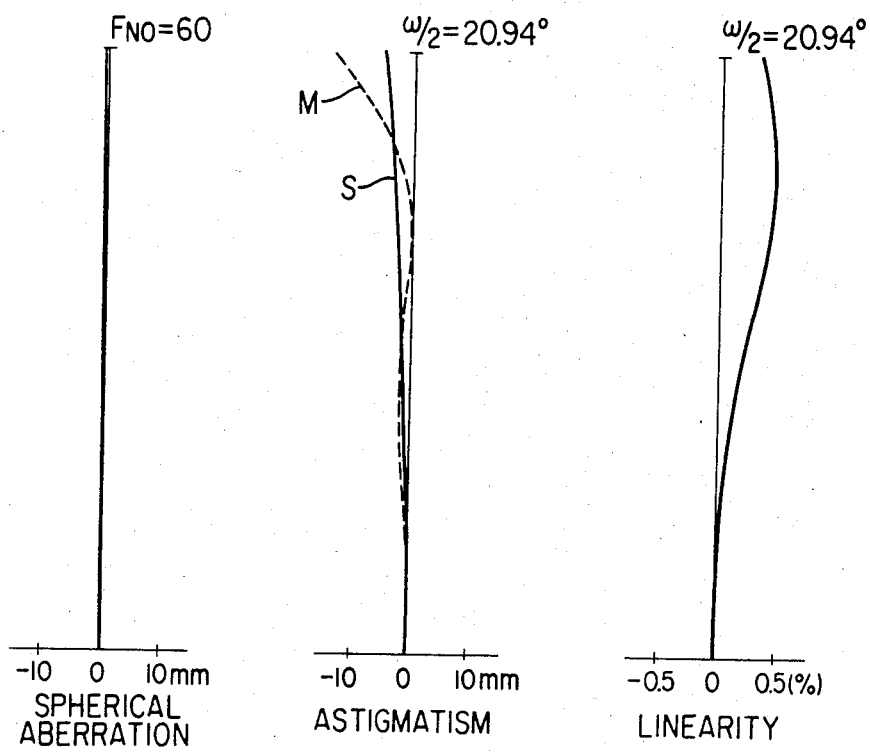

(FIG. 25(A) for construction; FIG. 25(B) for aberration)

| | | |
|---|---|---|
| $f = 300,$ | FNO = 1:60, | $\omega/2 = 20.94°,$ |
| wavelength used: | $\lambda = 0.6328\mu,$ | |
| | $d_0 = 72.4612$ | |
| $r_1 = -564.7932$ | $d_1 = 5.1875$ | $n_1 = 1.65$ |
| $r_2 = 132.5783$ | $d_2 = 38.7119$ | |
| $r_3 = 1546.3578$ | $d_3 = 36.0255$ | $n_2 = 1.65$ |
| $r_4 = -99.4955$ | | |

The aberration coefficients when the focal length is regularized as f=1.

| | | |
|---|---|---|
| $I = 34.8618,$ | $II = 5.2323,$ | $III = 0.1703$ |
| $IV = 0.1636,$ | $V = 0.5574$ | |

The power arrangement and proper coefficients for each block, when the focal length is regularized as f=1.

| | | |
|---|---|---|
| $\phi_1 = -1.8215,$ | $t = 0.25,$ | $B_{01} = -1.8215$ |
| $\phi_2 = 2.0682,$ | $e' = 0.2,$ | $B_{02} = -2.3878$ |

EXAMPLE 10

Figure 26A:
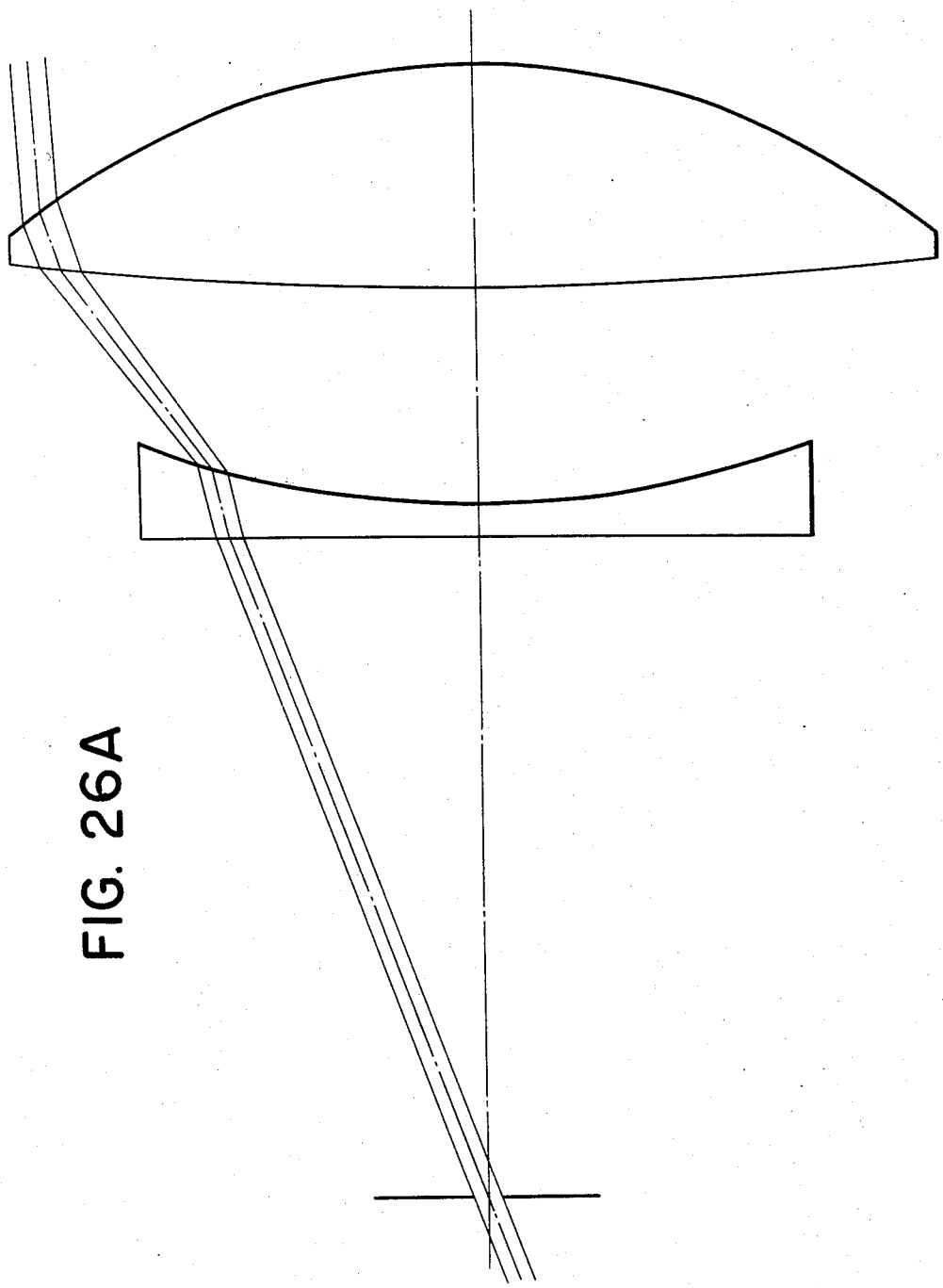
Figure 26B:
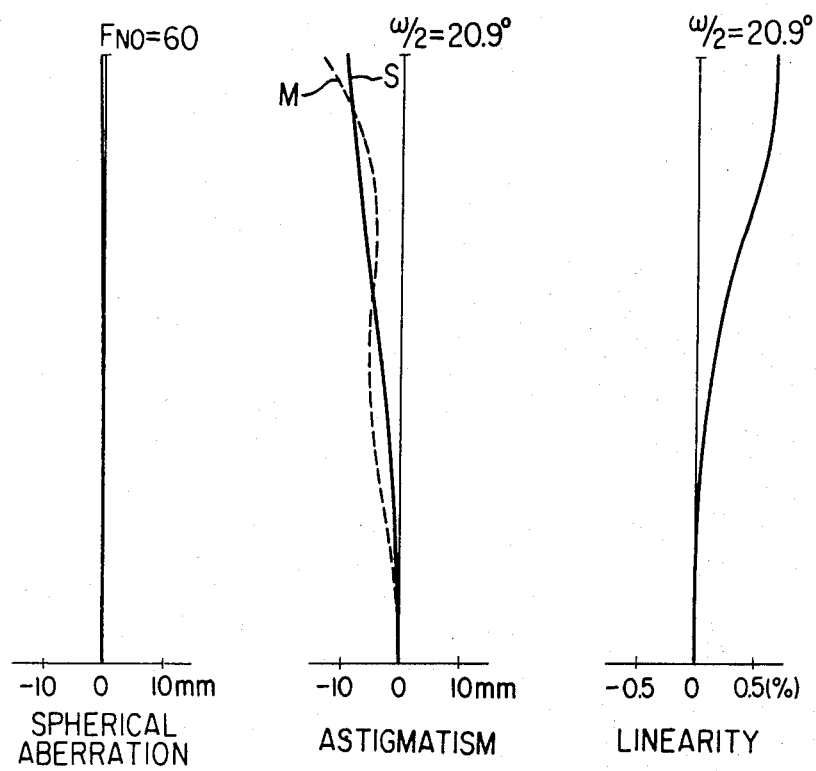

(FIG. 26(A) for construction, FIG. 26(B) for aberration)

| | | |
|---|---|---|
| $f = 300,$ | FNO = 1:60, | $\omega/2 = 20.9°,$ |
| wavelength used: | $\lambda = 0.6328\mu,$ | |
| | $d_0 = 11.64$ | |
| $r_1 = -16184.591$ | $d_1 = 6.002$ | $n_1 = 1.65$ |
| $r_2 = 166.148$ | $d_2 = 39.068$ | |
| $r_3 = 687.65$ | $d_3 = 40.125$ | $n_2 = 1.65$ |
| $r_4 = -128.454$ | | |

The aberration coefficients when the focal length is regularized as f=1.

| | | |
|---|---|---|
| $I = 16.2736,$ | $II = 3.7735,$ | $III = 0.3926$ |
| $P = 0.3733,$ | $V = 0.6205$ | |

The power arrangement and proper coefficients for each block, when the focal length is regularized as f=1.

| | | |
|---|---|---|
| $\phi_1 = -1.186,$ | $t = 0.4,$ | $B_{01} = -2.5134$ |
| $\phi_2 = 1.7669,$ | $e' = 0.2,$ | $B_{02} = -2.1419$ |

041791830254x

EXAMPLE 11

Figure 27A:
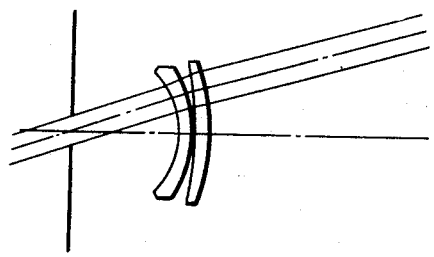
FIGS. 27A through 31A respectively show D-type lens construction according to the present invention, and FIGS. 27B through 31B respectively show the aberration diagram.
Figure 27B:
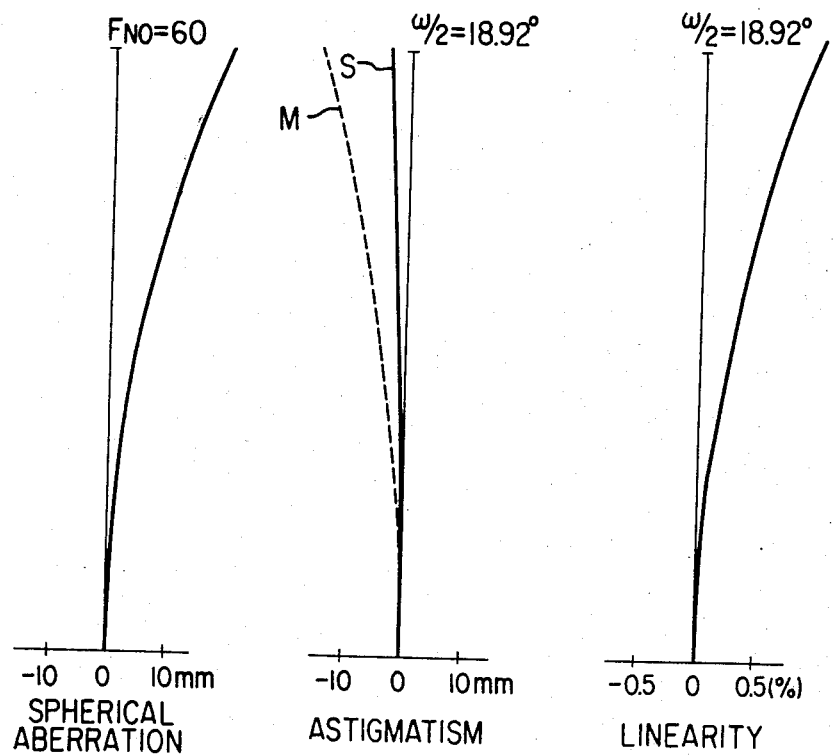

(FIG. 27(A) for construction; FIG. 27(B) for aberration)

| | | |
|---|---|---|
| $f = 300,$ | $FNO = 1:60,$ | $\omega/2 = 18.92°,$ |
| wavelength used: | $\lambda = 0.6328\mu,$ | |
| | $d_0 = 18.508$ | |
| $r_1 = -13.29$ | $d_1 = 2.24$ | $n_1 = 1.65$ |
| $r_2 = -19.315$ | $d_2 = 0.171$ | |
| $r_3 = -70.307$ | $d_3 = 2.3$ | $n_2 = 1.65$ |
| $r_4 = -27.263$ | | |

The aberration coefficients when the focal length is regularized as f=1.

| | | |
|---|---|---|
| $I = -1821.0861,$ | $II = -49.8906,$ | $III = 0.3634$ |
| $P = -0.1201,$ | $V = 0.4741$ | |

The power arrangement and proper coefficients for each block, when the focal length is regularized as f=1.

| | | |
|---|---|---|
| $\phi_1 = -3.9036,$ | $t = 0.4,$ | $B_{01} = 6.7412$ |
| $\phi_2 = 5.9023,$ | $e' = 0.025,$ | $B_{02} = -4.0712$ |

EXAMPLE 12

Figure 28A:
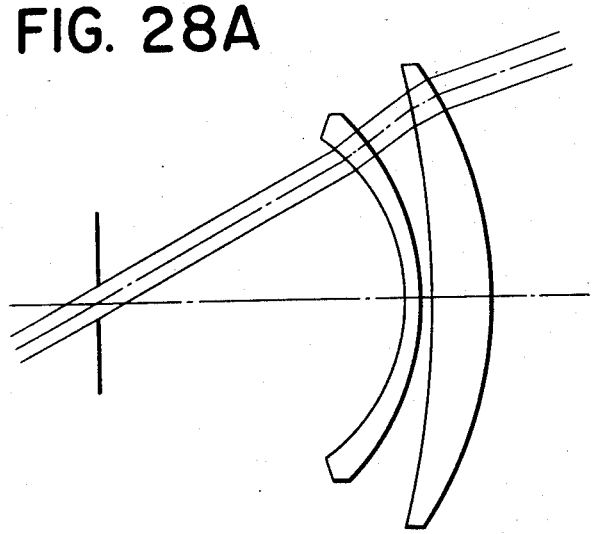
Figure 28B:
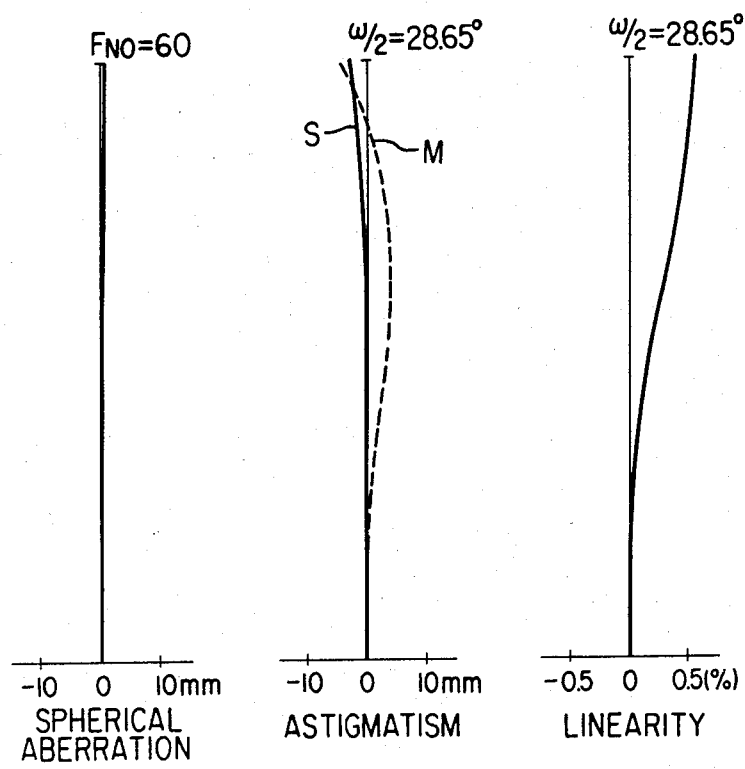

(FIG. 28(A) for construction; FIG. 28(B) for aberration)

| | | |
|---|---|---|
| $f = 300,$ | $FNO = 1:60,$ | $\omega/2 = 28.65°,$ |
| wavelength used: | $\lambda = 0.6328\mu,$ | |
| | $d_0 = 51.8253$ | |
| $r_1 = -31.5784$ | $d_1 = 2.6978$ | $n_1 = 1.81236$ |
| $r_2 = -41.1848$ | $d_2 = 1.6902$ | |
| $r_3 = -157.2545$ | $d_3 = 10.5417$ | $n_2 = 1.81236$ |
| $r_4 = -64.4092$ | | |

The aberration coefficients when the focal length is regularized as f=1.

| | | |
|---|---|---|
| $I = -99.722,$ | $II = -9.6294,$ | $III = -0.2382$ |
| $P = 0.2393,$ | $V = 0.5933$ | |

The power arrangement and proper coefficients for each block, when the focal length is regularized as f=1.

| | | |
|---|---|---|
| $\phi_1 = -1.5731,$ | $t = 0.1541,$ | $B_{01} = 7.1318$ |
| $\phi_2 = 2.347,$ | $e' = 0.0612,$ | $B_{02} = -3.492$ |

EXAMPLE 13

Figure 29A:
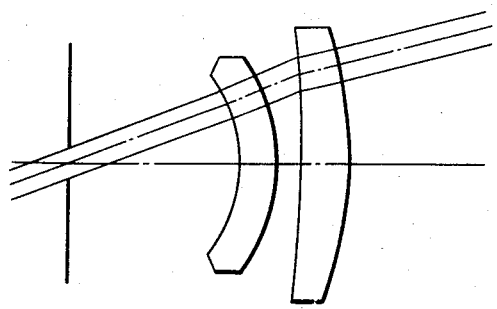
Figure 29B:
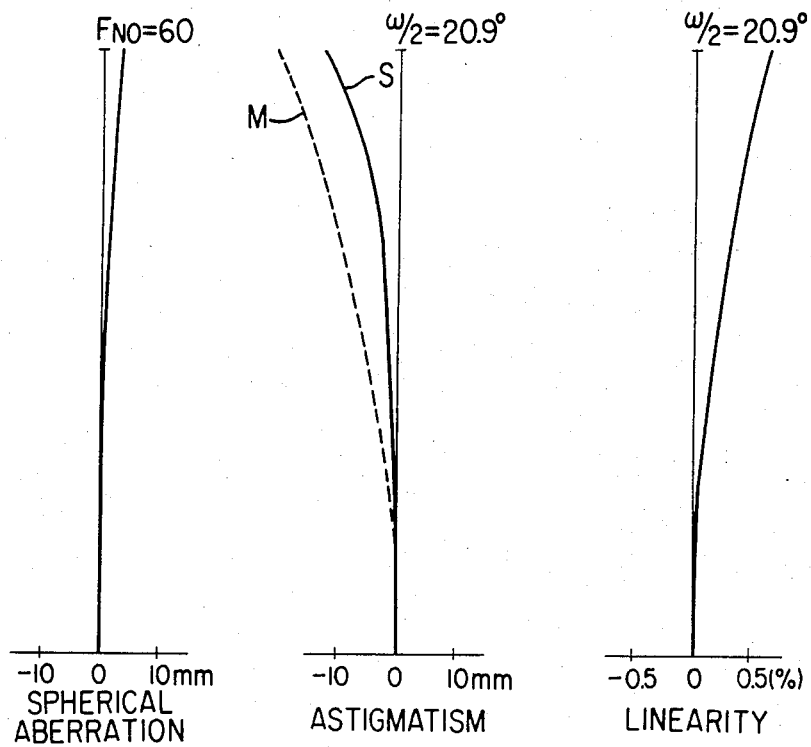

(FIG. 29(A) for construction; FIG. 29(B) for aberration)

| | | |
|---|---|---|
| $f = 300,$ | $FNO = 1:60,$ | $\omega/2 = 20.9°,$ |
| wavelength used: | $\lambda = 0.6328\mu,$ | |
| | $d_0 = 28.9$ | |
| $r_1 = -23.019$ | $d_1 = 5.878$ | $n_1 = 1.65$ |
| $r_2 = -31.234$ | $d_2 = 4.254$ | |
| $r_3 = -212.57$ | $d_3 = 8.185$ | $n_2 = 1.65$ |
| $r_4 = -62.67$ | | |

The aberration coefficients when the focal length is regularized as f=1.

| | | |
|---|---|---|
| $I = -295.1181,$ | $II = -9.4625,$ | $III = 0.3681$ |
| $P = -0.0205,$ | $V = 0.5562$ | |

The power arrangement and proper coefficients for each block, when the focal length is regularized as f=1.

| | | |
|---|---|---|
| $\phi_1 = -1.6,$ | $t = 0.05,$ | $B_{01} = 10.5434$ |
| $\phi_2 = 2.2414,$ | $e' = 0.1,$ | $B_{02} = -3.5497$ |

EXAMPLE 14

Figure 30A:
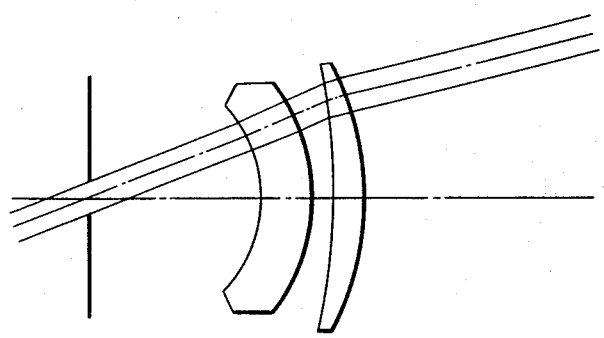
Figure 30B:
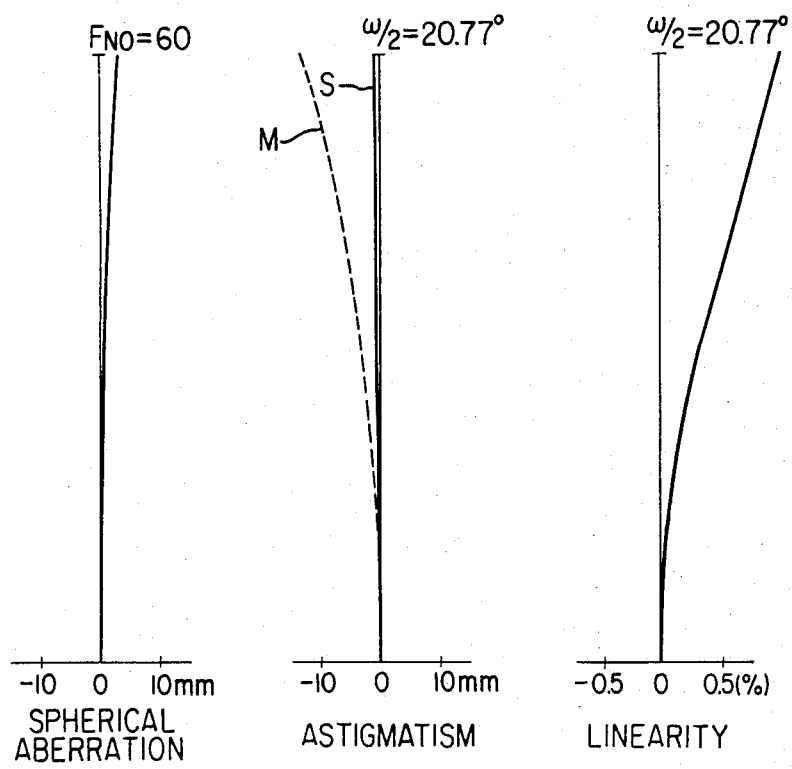

(FIG. 30(A) for construction; FIG. 30(B) for aberration)

| | | |
|---|---|---|
| $f = 300,$ | $FNO = 1:60,$ | $\omega/2 = 20.77°,$ |
| wavelength used: | $\lambda = 0.6328\mu,$ | |
| | $d_0 = 29.4033$ | |
| $r_1 = -22.2285$ | $d_1 = 8.0648$ | $n_1 = 1.65$ |
| $r_2 = -32.9487$ | $d_2 = 4.1422$ | |
| $r_3 = -125.9297$ | $d_3 = 4.6641$ | $n_2 = 1.65$ |
| $r_4 = -48.8046$ | | |

The aberration coefficients when the focal length is regularized as f=1.

| | | |
|---|---|---|
| $I = -283.0201,$ | $II = -7.3334,$ | $III = 0.273$ |
| $P = -0.2468,$ | $V = 0.4906$ | |

The power arrangement and proper coefficients for each block, when the focal length is regularized as f=1.

| | | |
|---|---|---|
| $\phi_1 = -2.0081,$ | $t = 0.05,$ | $B_{01} = 8.2543$ |
| $\phi_2 = 2.505,$ | $e' = 0.1,$ | $B_{02} = 4.0656$ |

EXAMPLE 15

Figure 31A:
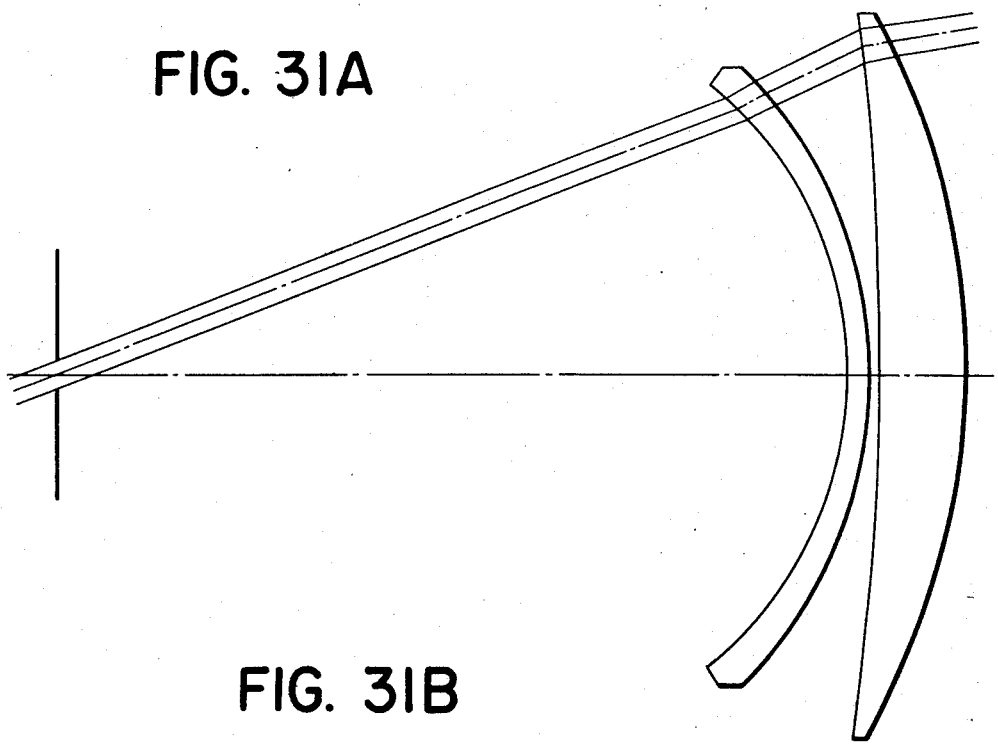
Figure 31B:
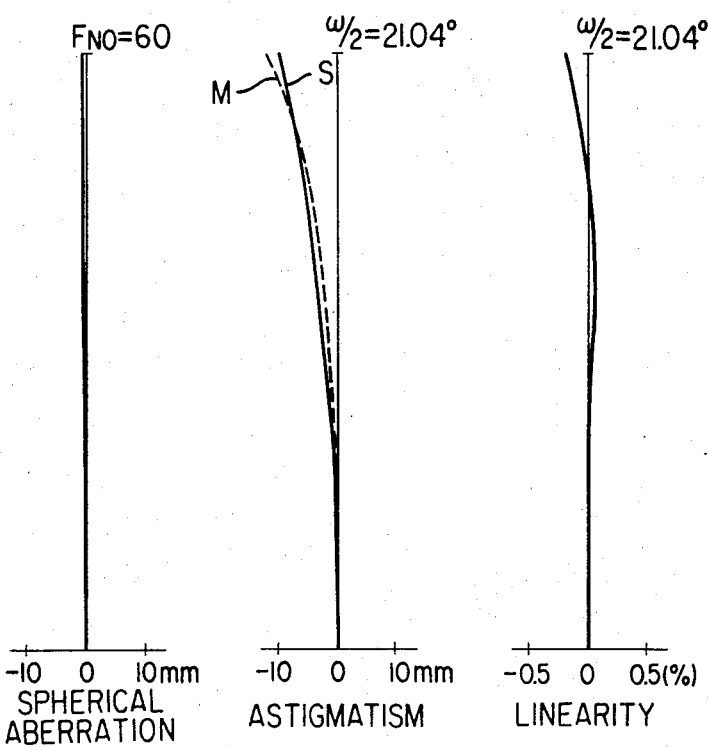

(FIG. 31(A) for construction; FIG. 31(B) for aberration)

| | | |
|---|---|---|
| $f = 300,$ | $FNO = 1:60,$ | $\omega/2 = 21.04°,$ |
| wavelength used: | $\lambda = 0.6328\mu,$ | |
| | $d_0 = 134.4845$ | |
| $r_1 = -59.1845$ | $d_1 = 3.3766$ | $n_1 = 1.65$ |
| $r_2 = -68.8766$ | $d_2 = 1.3993$ | |
| $r_3 = -429.3281$ | $d_3 = 14.6846$ | $n_2 = 1.65$ |
| $r_4 = -109.7716$ | | |

The aberration coefficients when the focal length is regularized as f=1.

| | | |
|---|---|---|
| $I = 3.2452,$ | $II = 0.0725,$ | $III = -0.0772$ |
| $P = 0.5204,$ | $V = 0.6269$ | |

The power arrangement and proper coefficients for each block, when the focal length is regularized as $f=1$.

| $\phi_1 = -0.4$, | $t = 0.4$, | $B_{01} = 17.8139$ |
|---|---|---|
| $\phi_2 = 1.3462$, | $e' = 0.1$, | $B_{02} = -3.3721$ |

In view of EXAMPLES 1 through 10 as described in the foregoing, the ranges of the values of $$\frac{1}{r_1}, \frac{1}{r_2}, \frac{1}{r_3}, \frac{1}{r_4}$$

and $d_2$ in the B-type lens construction are as follows.

$$-2.8679 \times \frac{1}{f} \leq \frac{1}{r_1} \leq 11.6239 \times \frac{1}{f}$$

$$-0.3498 \times \frac{1}{f} \leq \frac{1}{r_2} \leq 14.9534 \times \frac{1}{f}$$

$$0.1663 \times \frac{1}{f} \leq \frac{1}{r_3} \leq 6.8152 \times \frac{1}{f}$$

$$-4.0539 \times \frac{1}{f} \leq \frac{1}{r_4} \leq 2.5442 \times \frac{1}{f}$$

$$0.0019 \times f \leq d_2 \leq 0.1881 \times f$$

(where: f is the focal length of the lens system.)

Similarly, in view of EXAMPLES 11 through 15 inclusive, the ranges of the values of $$\frac{1}{r_1}, \frac{1}{r_2}, \frac{1}{r_3}, \frac{1}{r_4}$$

and $d_2$ in the D-type lens construction are as follows.

$$-20.5332 \times \frac{1}{f} \leq \frac{1}{r_1} \leq -5.0689 \times \frac{1}{f}$$

$$-13.7816 \times \frac{1}{f} \leq \frac{1}{r_2} \leq -4.3556 \times \frac{1}{f}$$

$$-5.5819 \times \frac{1}{f} \leq \frac{1}{r_3} \leq -0.6988 \times \frac{1}{f}$$

$$-12.19 \times \frac{1}{f} \leq \frac{1}{r_4} \leq -2.7329 \times \frac{1}{f}$$

$$0.0004 \times f \leq d_2 \leq 0.02779 \times f$$

When the lenses as described in the foregoing EXAMPLES 1 through 15 inclusive are used in the light beam scanning device shown in FIG. 1, there can be obtained such a device that can perform writing-in of informations at a constant speed.

Figure 32:
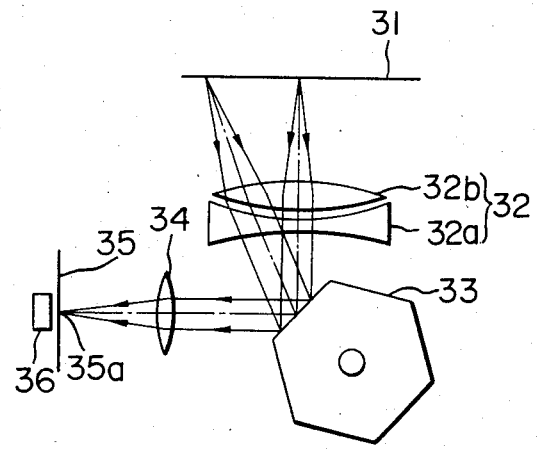
FIG. 32 is a schematic diagram showing one embodiment of the light beam scanning device according to the present invention.

FIG. 32 shows one example of a device, among various sorts of the light beam scanning devices according to the present invention, in which read-out operation is performed. The read-out scanning device shown in this figure of drawing is of such a type that reads out the light beam from an external light source of a general type (not shown) which is reflected on the scanning surface. In the illustration, a reference numeral 31 designates the scanning surface, 32 refers to the f-$\theta$ lens as presented in the afore-described Examples, wherein a concave lens 32a is disposed to the side of the deflector and a convex lens 32b to the side of the scanning surface. A reference numeral 33 designates a rotatory polygonal mirror which rotates at a constant speed, 34 refers to a light converging lens, 35 denotes a slit plate having a slit 35a, and 36 a photoelectric conversion element. In this device construction, the light beam from the scanning surface 31 is deflected by the deflector 33 through the f-$\theta$ lens system 32, then focussed on the slit plate 35 by the light converging lens 34, and the thus focussed beam on the slit 35a passes through the slit 35a and is detected by the photoelectric conversion element 36. At this time, when the rotatory polygonal mirror 33 rotates at a constant speed, the position of the read-out spot on the scanning surface also varies at the constant speed.

What we claim is:

1. A light beam scanning device comprising:
   (a) a light source section for generating a scanning beam;
   (b) a deflector which receives the light beam from said light source section, and effects deflection of said light beam in a predetermined direction at a constant angular speed;
   (c) a surface to be scanned by said light beam which has been deflected by said deflector; and
   (d) a focussing lens for the scanning operation, said lens being disposed between said deflector and said scanning surface and being composed of a front single lens, having a negative refractive power, at the side facing the deflector and a rear single lens, having a positive reflective power, at the side facing said surface to be scanned, wherein the light beam from said deflector passes through said front single lens and then through said rear single lens and is focussed on said scanning surface, and wherein said focussing lens causes the focussed beam which scans said scanning surface to move at a constant speed.

2. The light beam scanning device as claimed in claim 1, wherein said focussing lens satisfies the following relationship under the conditions that, when the refractive index of said front single lens is $N_1$, the refractive index of said rear single lens is $N_2$, $1.46 \leq N_1 \leq 1.84$, $1.46 \leq N_2 \leq 1.84$, and the focal length of said focussing lens is 1:

$$-6 \leq \phi_1 \leq -0.4$$

$$0.015 \leq e' \leq 0.2$$

$$-11.4634 \leq B_{01} = -\frac{N_1}{N_1 - 1} + \frac{N_1}{N_1}\left(\frac{1}{R_1}\right) \leq 0.8648$$

(where: $\phi_1$ is the power of the front single lens when the focal length of the focussing lens is 1; $e'$ denotes the distance between the principal points of the front single lens and the rear single lens, when the focal length of the focussing lens is 1; $B_{01}$ is an intrinsic coefficient of the front single lens; and $R_1$ is the radius of the deflector-side surface of said front single lens).

3. The light beam scanning device as claimed in claim 1, wherein said focussing lens satisfies the following relationships under the conditions that, when the refractive index of said front single lens is $N_1$ and the refractive index of said rear single lens is $N_2$, $1.46 \leq N_1 \leq 1.84$, $1.46 \leq N_2 \leq 1.84$, and the focal length of said focussing lens is 1:

$$-6 \leq \phi_1 \leq -0.4$$

$$0.015 \leq e' \leq 0.2$$

$$6.5615 \leq B_{01} = -\frac{N_1}{N_1-1} + \frac{N_1+1}{N_1}\left(\frac{1}{R_1}\right) \leq 18.178$$

(where: $\phi_1$ is the power of the front single lens when the focal length of the focussing lens is 1: $e'$ denotes the distance between the principal points of the front single lens and the rear single lens, when the focal length of the focussing lens is 1; $B_{01}$ is an intrinsic coefficient of the front single lens; and $R_1$ is the radius of the deflector side surface of said front single lens).

* * * * *

UNITED STATES PATENT AND TRADEMARK OFFICE
CERTIFICATE OF CORRECTION

PATENT NO. : 4,179,183
DATED : December 18, 1979
INVENTOR(S) : MASAMICHI TATEOKA, ET AL.

Figure 19A:
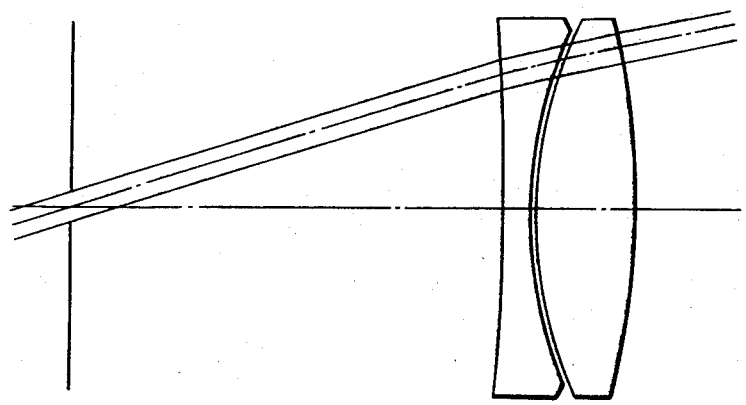
Figure 19B:
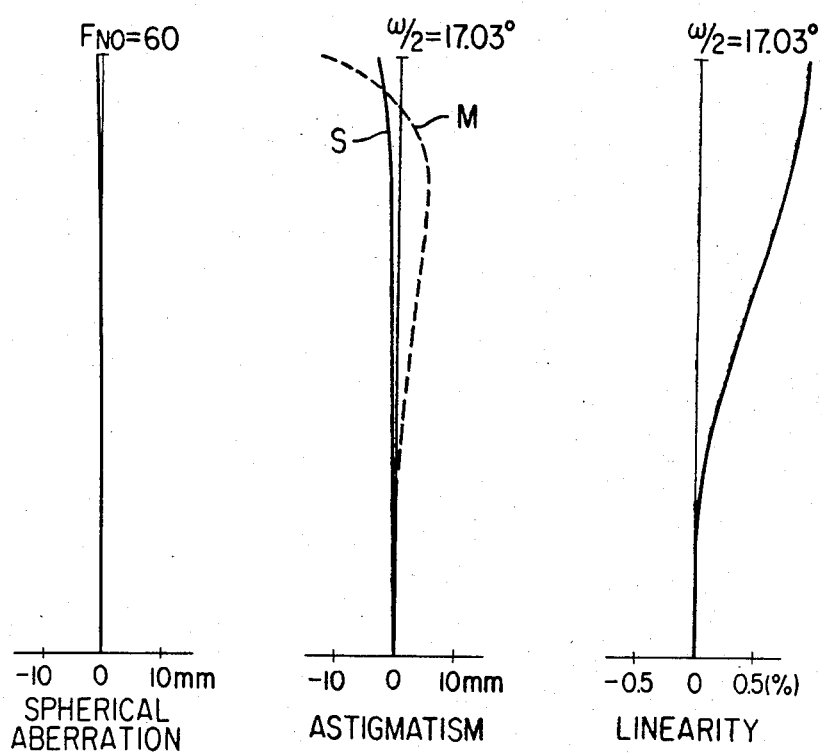

It is certified that error appears in the above-identified patent and that said Letters Patent are hereby corrected as shown below:

Column 2, line 30, "is" should read --in--;

Column 9, line 20, "pricipal" should read --principal--;

Column 11, line 59, "FIG.(19(A)" should read --(FIG.19(A)--;

Column 12, line 30, "regularizedas" should read --regularized as--;

Column 17, line 49, "0.02779" should read --0.0279--.

Signed and Sealed this

Seventeenth Day of June 1980

[SEAL]

Attest:

SIDNEY A. DIAMOND

Attesting Officer

Commissioner of Patents and Trademarks